(12) United States Patent
Akkarakaran et al.

(10) Patent No.: US 11,943,769 B2
(45) Date of Patent: Mar. 26, 2024

(54) SIDELINK CARRIER AGGREGATION FOR BEAMFORMING AND PATHLOSS REFERENCE SIGNALS

(71) Applicant: QUALCOMM Incorporated, San Diego, CA (US)

(72) Inventors: Sony Akkarakaran, Poway, CA (US); Jung Ho Ryu, Fort Lee, NJ (US); Tao Luo, San Diego, CA (US); Junyi Li, Fairless Hills, PA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 17/391,543

(22) Filed: Aug. 2, 2021

(65) Prior Publication Data
US 2022/0053538 A1 Feb. 17, 2022

Related U.S. Application Data

(60) Provisional application No. 63/065,675, filed on Aug. 14, 2020.

(51) Int. Cl.
*H04W 4/40* (2018.01)
*H04B 7/06* (2006.01)
(Continued)

(52) U.S. Cl.
CPC .......... *H04W 72/20* (2023.01); *H04L 5/0053* (2013.01)

(58) Field of Classification Search
CPC ............. H04W 72/20; H04W 72/0453; H04L 5/0053; H04B 7/0617; H04B 7/063
See application file for complete search history.

(56) References Cited

U.S. PATENT DOCUMENTS

| | | | | |
|---|---|---|---|---|
| 1,141,066 | A * | 5/1915 | Lloyd | B21C 37/104 72/181 |
| 10,904,940 | B2 * | 1/2021 | Zhou | H04B 7/06 |

(Continued)

OTHER PUBLICATIONS

3GPP TSG-RAN#91 Meeting, R4-1905360 Title: Future discussion on TCI state switching requirement (Year: 2019).*
(Continued)

*Primary Examiner* — Diane L Lo
*Assistant Examiner* — Abusayeed M Haque
(74) *Attorney, Agent, or Firm* — Loza & Loza, LLP

(57) ABSTRACT

Aspects relate to mechanisms for wireless communication devices to update transmission configuration indicator states (TCI-states), spatial relation (SR) indicators (SRIs), or pathloss reference signals (PL-RSs) for a group of two or more component carriers (CCs) for multi-component carrier communication. A radio access network (RAN) node may generate a message indicating one or more TCI-states, one or more SRs, or one or more PL-RSs to utilize for multi-CC communication. The message may include an index identifying a group of two or more CCs of a plurality of access CCs or a plurality of sidelink CCs associated with the one or more TCI-states, the one or more SRs, or the one or more PL-RSs. A user equipment (UE) may receive the message and update the one or more TCI-states, the one or more SRs, or the one or more PL-RSs for the group of two or more CC for the multi-CC communication based on the message.

30 Claims, 17 Drawing Sheets

(51) Int. Cl.
*H04L 5/00* (2006.01)
*H04W 72/20* (2023.01)

(56) References Cited

U.S. PATENT DOCUMENTS

| | | | |
|---|---|---|---|
| 11,611,468 B2* | 3/2023 | Zhou | H04L 5/00 |
| 2019/0306924 A1 | 10/2019 | Zhang et al. | |
| 2020/0107353 A1 | 4/2020 | Jung et al. | |
| 2020/0256573 A1* | 8/2020 | Zhuo | F24F 11/56 |
| 2020/0351069 A1 | 11/2020 | Grant et al. | |
| 2021/0028843 A1* | 1/2021 | Zhou | H04B 7/063 |
| 2022/0311579 A1 | 9/2022 | Zhang et al. | |
| 2022/0312458 A1* | 9/2022 | Sun | H04L 5/0091 |
| 2023/0136240 A1* | 5/2023 | Zhu | H04L 5/0048 370/329 |

OTHER PUBLICATIONS

3GPP TSG RAN WG1#106E, R1-2106418 Title: Reply LS to RAN1 Ls on TCI state update for L1/L2-Centric Inter-Cell Mobility (Year: 2021).*
3GPP TSG RAN WG2#101BIS, R2-1804212 (Year: 2018).*
AT&T, et al., "RAN1 UE Features List for Rel-16 NR", 3GPP TSG RAN WG1 #100-e, 3GPP Draft, R1-2000930, 3rd Generation Partnership Project (3GPP), Mobile Competence Centre, 650, Route Des Lucioles, F-06921 Sophia-Antipolls Cedex, France, vol. RAN WG1, No. e-Meeting, Feb. 24, 2020-Mar. 6, 2020, 151 Pages, Mar. 2, 2020 (Mar. 2, 2020), XP051858883, Retrieved from the Internet: URL: https: //ftp.3gpp.org/tsg_ran/WG1_RL1/TSGR1_100_e/Docs/R1-2000930.zip [retrieved on Mar. 2, 2020] p. 58, p. 61, p. 66-p. 71, p. 80, p. 85, p. 90-p. 91, p. 152.
International Search Report and Written Opinion—PCT/US2021/044324—ISA/EPO—dated Nov. 11, 2021.

* cited by examiner

SIDELINK CARRIER AGGREGATION FOR BEAMFORMING AND PATHLOSS REFERENCE SIGNALS

CROSS-REFERENCE TO RELATED APPLICATIONS

The present application for patent claims priority to and the benefit of U.S. Provisional Application No. 63/065,675, titled "SIDELINK CARRIER AGGREGATION FOR BEAM FORMING AND PATHLOSS REFERENCE SIGNALS" filed Aug. 14, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to configuration and indication of beams and pathloss reference signals for sidelink communication.

BACKGROUND

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

In wireless communication systems, such as those specified under standards for 5G New Radio (NR), both the base station and wireless communication devices may utilize beamforming to compensate for high path loss and short range. Beamforming is a signal processing technique used with an antenna array for directional signal transmission and/or reception. For example, an antenna in the antenna array can transmit a signal that is combined with other signals of other antennas of the same array in such a way that signals at particular angles experience constructive interference while others experience destructive interference. Beamforming may be implemented in both traditional cellular network configurations and sidelink network configurations on higher frequency bands to support increased data rates.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method for wireless communication at a user equipment (UE) is provided. The method includes receiving a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. The method also includes updating the one or more TCI-states or the one or more SRs for the group of two or more component carriers for the multi-component carrier communication based on the message.

A user equipment (UE) in a radio access network (RAN) of a wireless communication system is provided. The UE includes a wireless transceiver, a memory, and a processor communicatively coupled to the wireless transceiver and the memory. The processor and the memory are configured to receive a message indicating one or more transmission configuration indicator states (TCI-states) or one or more spatial relations (SRs) to utilize for multi-component carrier communication. The message comprising an index identifying a group of two or more component carriers of a plurality of access component carriers or a plurality of sidelink component carriers associated with the one or more TCI-states or the one or more SRs. The processor and the memory are also configured to update the one or more TCI-states or the one or more SRs for the group of two or more component carriers for the multi-component carrier communication based on the message.

A method for wireless communication at a radio access network (RAN) node is provided. The method includes generating a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. The method also includes transmitting the message to a user equipment (UE) to update the one or more TCI-states or the one or more SRs for the group of two or more component carriers for the multi-component carrier communication based on the message.

A radio access network (RAN) entity in a RAN of a wireless communication system is provided. The RAN entity includes a wireless transceiver, a memory, and a processor communicatively coupled to the wireless transceiver and the memory. The processor and the memory are configured to generate a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. The processor and the memory are also configured to transmit the message to a user equipment (UE) to update the one or more TCI-states or the one or more SRs for the group of two or more component carriers for the multi-component carrier communication based on the message.

A method for wireless communication at a user equipment (UE) is provided. The method includes receiving a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The method also includes updating the one or more PL-RSs for the group of two or more component carriers for the multi-component carrier communication based on the message.

A user equipment (UE) in a radio access network (RAN) of a wireless communication system is provided. The UE includes a wireless transceiver, a memory, and a processor communicatively coupled to the wireless transceiver and the memory. The processor and the memory are configured to receive a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The processor and the memory are also configured to update the one or more PL-RSs for the group of two or more component carriers for the multi-component carrier communication based on the message.

A method for wireless communication at a radio access network (RAN) node is provided. The method includes generating a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The method also includes transmitting the message for updating the one or more PL-RSs for the group of two or more component carriers for the multi-component carrier communication based on the message.

A radio access network (RAN) entity in a RAN of a wireless communication system is provided. The RAN entity includes a wireless transceiver, a memory, and a processor communicatively coupled to the wireless transceiver and the memory. The processor and the memory are configured to generate a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The processor and the memory are also configured to transmit the message for updating the one or more PL-RSs for the group of two or more component carriers for the multi-component carrier communication based on the message.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
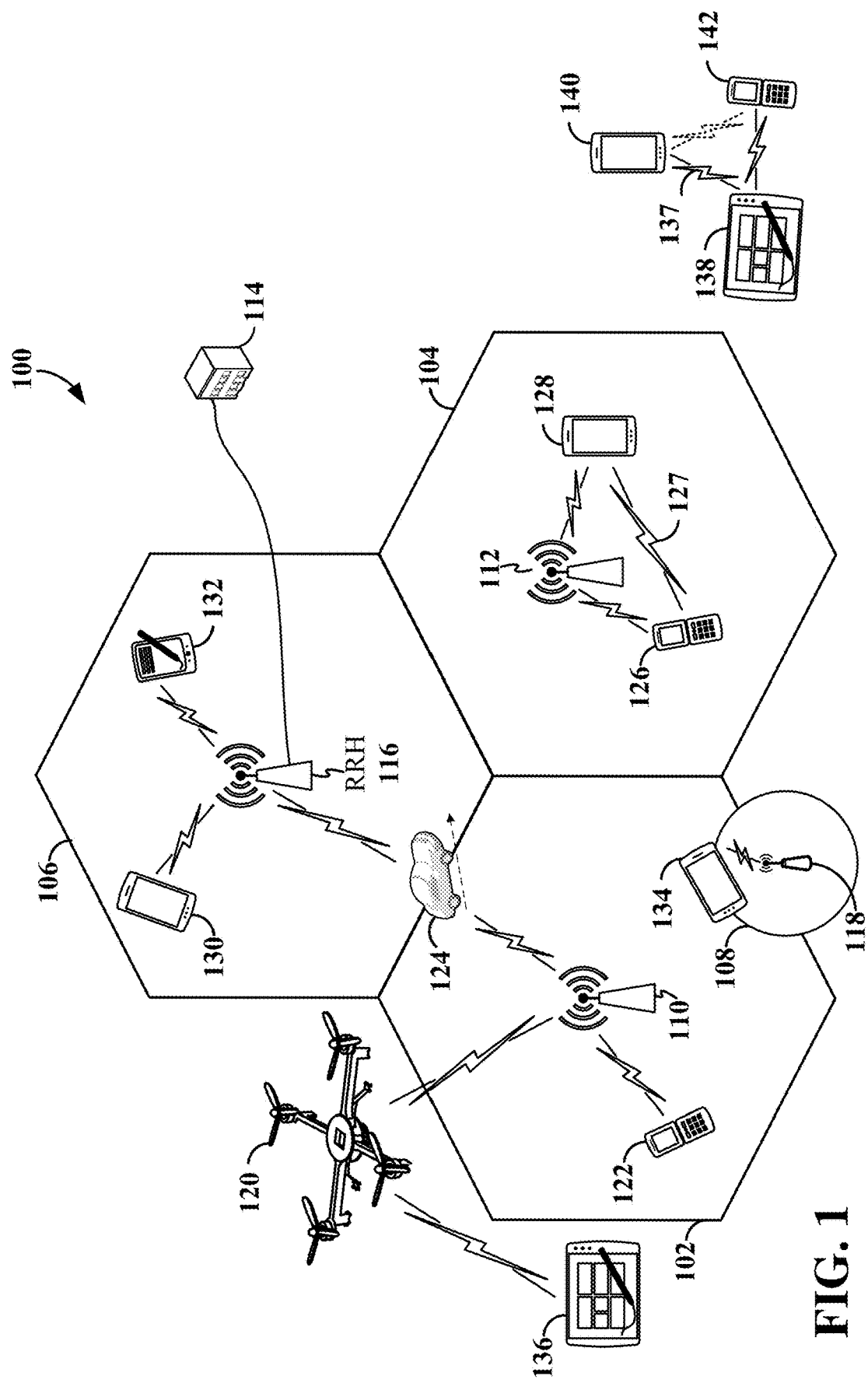
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to a scheduling entity (e.g., a UE for sidelink communication, a base station for access communication) generating a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. For example, the message may be a sidelink, medium access control (MAC) control element (MAC-CE), a radio access network (RAN) (e.g., access) MAC-CE, sidelink control information (SCI), downlink control information (DCI), a RAN (e.g., access) radio resource control (RRC) message, or the like.

The scheduling entity may transmit the message to a scheduled entity (e.g., another UE) to update the one or more TCI-states or the one or more SRs for the group of two or more component carriers for the multi-component carrier communication based on the message. In response to receiving the message, the scheduled entity may update the one or more TCI-states or the one or more SRs for the group of two or more component carriers for the multi-component carrier communication based on the message. For example, when the scheduled entity receives the updated TCI-states or the SRs for the group of two or more component carriers, the scheduled entity may be able to identify whether the updates are for the access link, the sidelink, or both. Thus, the system allows for updating TCI-states or SRs on the access link, sidelink, or both.

Similarly, various aspects of the disclosure relate to a scheduling entity (e.g., a UE for sidelink communication, a base station for access communication) generating a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. For example, the message may be a sidelink MAC-CE, a RAN MAC-CE, SCI, DCI, a RAN RRC message, or the like.

The scheduling entity may transmit the message to a scheduled entity (e.g., another UE) to update the one or more PL-RSs for the group of two or more component carriers for the multi-component carrier communication based on the message. In response to receiving the message, the scheduled entity may update the one or more PL-RSs for the group of two or more component carriers for the multi-component carrier communication based on the message. For example, when the scheduled entity receives the updated PL-RSs for the group of two or more component carriers, the scheduled entity may be able to identify whether the updates are for the access link, the sidelink, or both. Thus, the system allows for updating PL-RSs on the access link, sidelink, or both.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 2:
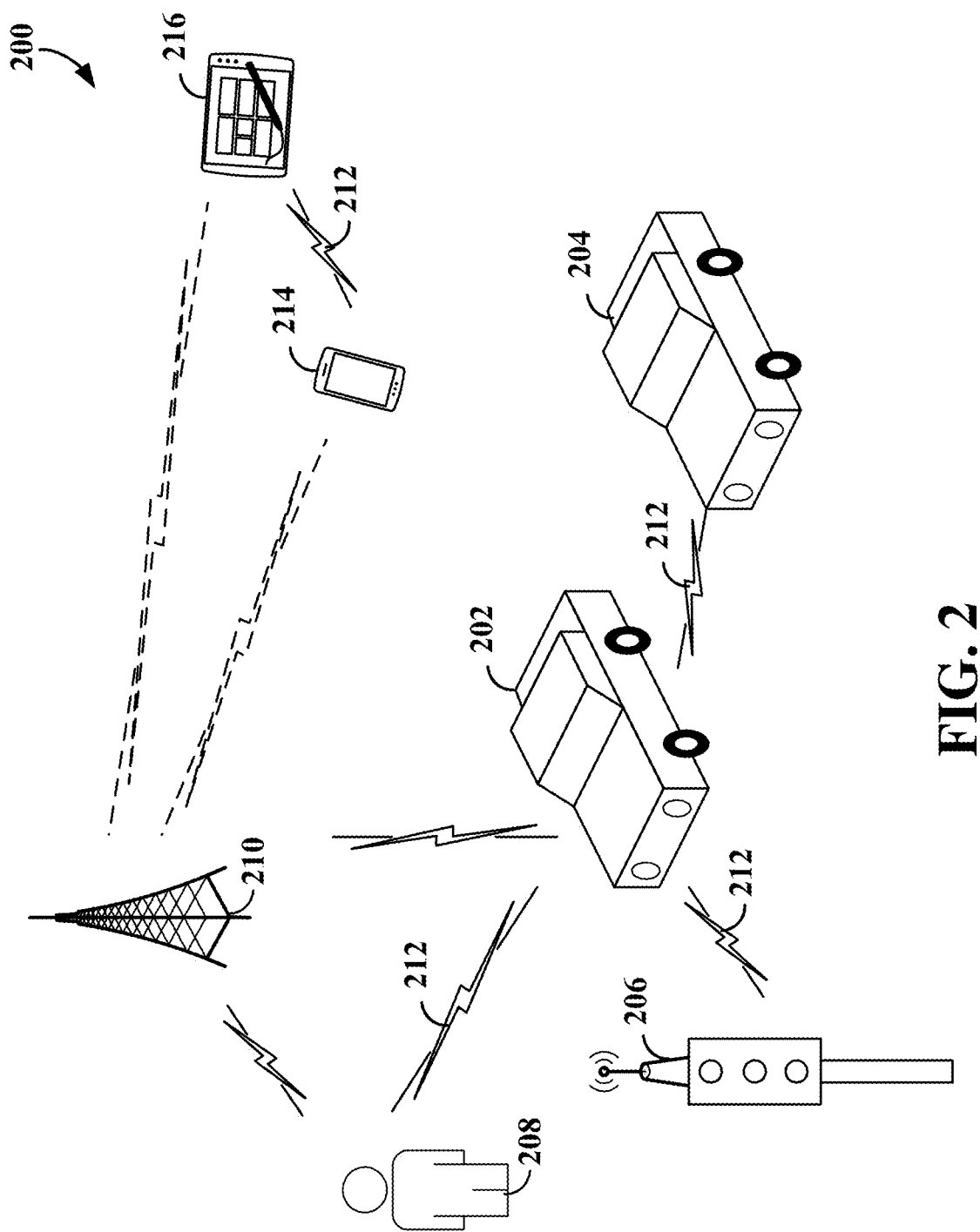
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., UEs 214 and 216) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., V-UE 202 and P-UE 208) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. For example, the base station 210 may schedule the sidelink communication via DCI 3_0. In some examples, the base station 210 may schedule the PSCCH/PSSCH within uplink resources indicated in DCI 3_0. The base station 210 may further activate preconfigured sidelink grants (e.g., configured grants) for sidelink communication among the sidelink devices. In some examples, the base station 210 may activate a configured grant (CG) via RRC signaling. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH or within the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 3:
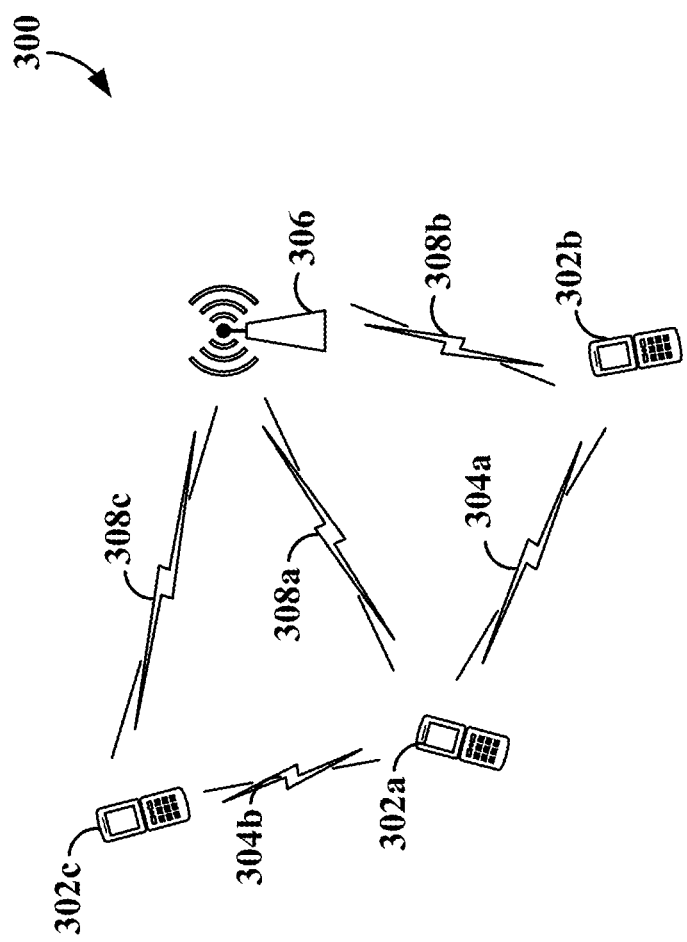
FIG. 3 is a diagram illustrating an example of a wireless communication system for facilitating both cellular and sidelink communication according to some aspects.

FIG. 3 is a diagram illustrating an example of a wireless communication system 300 for facilitating both cellular and sidelink communication. The wireless communication system 300 includes a plurality of wireless communication devices 302a, 302b, and 302c and a base station (e.g., eNB or gNB) 306. In some examples, the wireless communication devices 302a, 302b, and 302c may be UEs capable of implementing D2D or V2X devices within a V2X network.

The wireless communication devices 302a and 302b may communicate over a first PC5 interface 304a, while wireless communication devices 302a and 302c may communicate over a second PC5 interface 304b. Wireless communication devices 302a, 302b, and 302c may further communicate with the base station 306 over respective Uu interfaces 308a, 308b, and 308b. The sidelink communication over the PC5 interfaces 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 304a and 304b and Uu interfaces 308a-308c, such that resources on the common carrier may be allocated for both sidelink communication between wireless communication devices 302a-302c and cellular communication (e.g., uplink and downlink communication) between the wireless communication devices 302a-302c and the base station 306. For example, the wireless communication system 300 may be configured to support a V2X network in which resources for both sidelink and cellular communication are scheduled by the base station 306. In other examples, the wireless communication devices 302a-302c may autonomously select sidelink resources (e.g., from one or more frequency bands or sub-bands designated for sidelink communication) for communication therebetween. In this example, the wireless communication devices 302a-302c may function as both scheduling entities and scheduled entities scheduling sidelink resources for communication with each other.

Figure 4:
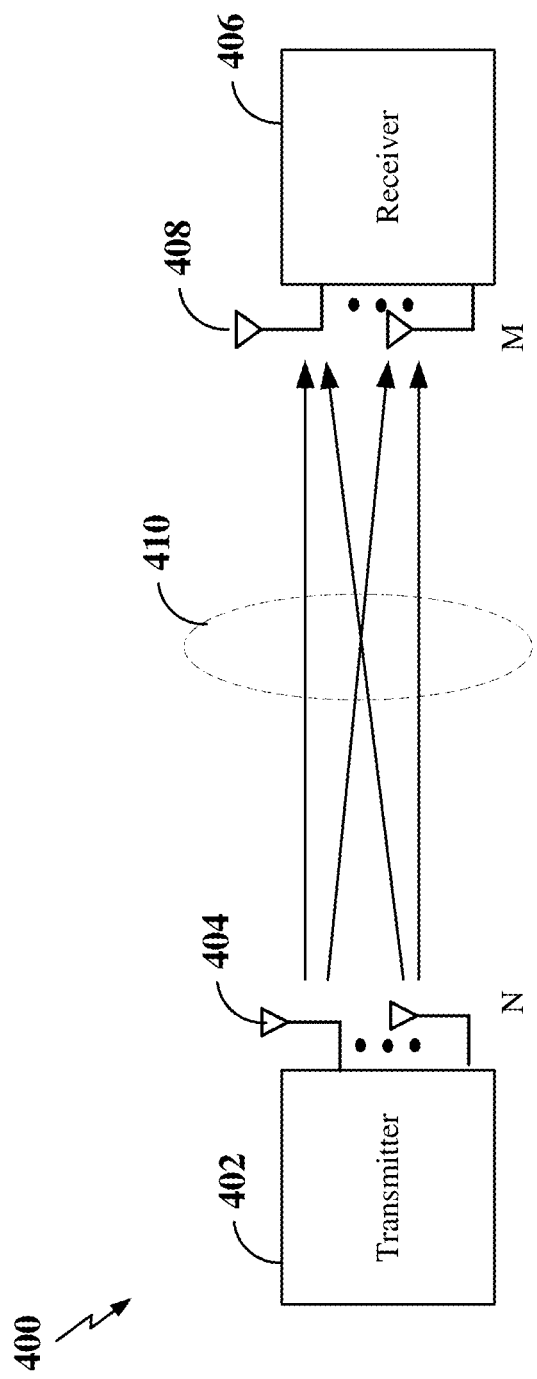
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 or higher (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems, such as NR SL or V2X, utilizing FR2.

Figure 5:
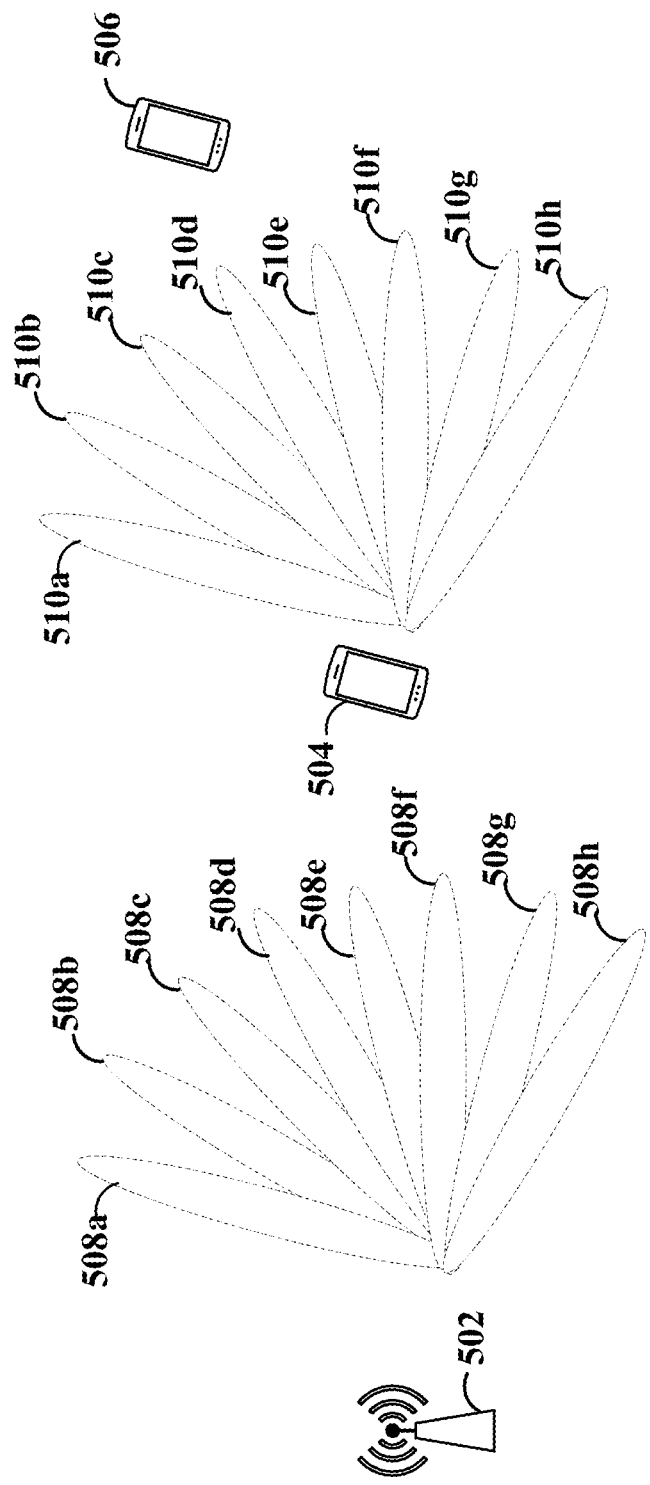
FIG. 5 is a diagram illustrating communication between a devices using beamformed signals according to some aspects.

FIG. 5 is a diagram illustrating communication between a radio access network (RAN) node 502, a first wireless communication device 504, and a second wireless communication device 506 using beamformed sidelink signals according to some aspects. Each of the RAN node 502 (e.g., a base station, such as a gNB) and the first wireless communication device 504 may be any of the receiving devices or transmitting devices illustrated in any of FIGS. 1-4. Each of the first wireless communication device 504 and the second wireless communication device 506 may be any of the UEs, V2X devices, transmitting devices or receiving devices illustrated in any of FIGS. 1-4.

In the example shown in FIG. 5, the radio access network (RAN) node 502 and the first wireless communication device 504 may be configured to communicate access (e.g., Uu) signals on one or more of a plurality of beams 508a, 508b, 508c, 508d, 508e, 508f, 508g, and 508h. Although the beams 508a, 508b, 508c, 508d, 508e, 508f, 508g, and 508h are illustrated in FIG. 5 as being generated on the RAN node 502, it should be understood that the same concepts described herein apply to beams generated on the first wireless communication device 504. For example, each of the RAN node 502 and the first wireless communication device 504 may select one or more beams to transmit access signals to the other communication device. In some examples, due to channel reciprocity, the selected beam(s) on each of the RAN node 502 and the first wireless communication device 504 may be used for both transmission and reception of access signals. It should be noted that while some beams are illustrated as adjacent to one another, such an arrangement may be different in different aspects. In some examples, the RAN node 502 and the first wireless communication device 504 may generate more or less beams distributed in different directions.

The number of beams on which a particular RAN node 502 or the first wireless communication device 504 may simultaneously communicate may be defined based on NR standards and specifications and capabilities of the RAN node 502 and the first wireless communication device 504. For example, the number of beams may be determined based on a number of antenna panels configured on the RAN node 502 or the first wireless communication device 504. Each beam may be utilized, for example, to transmit a respective layer for MIMO communication.

In some examples, to select one or more beams for communication on a access link between the RAN node 502 and the first wireless communication device 504, the RAN node 502 may transmit an access reference signal, such as an access synchronization signal block (SSB) or an access channel state information (CSI) reference signal (RS), on each of the plurality of beams 508a, 508b, 508c, 508d, 508e, 508f, 508g, and 508h in a beam-sweeping manner towards the first wireless communication device 504. The first wireless communication device 504 searches for and identifies the beams based on the beam reference signals. The first wireless communication device 504 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The first wireless communication device 504 may then transmit a beam measurement report to the RAN node 502 indicating the beam quality of one or more of the measured beams. The RAN node 502 may then select the particular beam(s) for communication between the RAN node 502 and the first wireless communication device 504 on the access link based on the beam measurement report. The RAN node 502 may then signal the selected beam(s) via, for example, a radio resource control (RRC) message or via a medium access control (MAC) control element (CE).

Each selected beam on one of the communication devices (e.g., the RAN node 502 or the first wireless communication device 504) may form a beam pair link (BPL) with a corresponding selected beam on the other communication device. Thus, each BPL includes corresponding transmit and receive beams on the RAN node 502 and the first wireless communication device 504. For example, a BPL may include a first transmit/receive beam on the RAN node 502 and a second transmit/receive beam on the first wireless communication device 504. To increase the data rate, multiple BPLs can be used to facilitate spatial multiplexing of multiple data streams. In some examples, the different BPLs can include beams from different antenna panels.

Also, in the example shown in FIG. 5, the first wireless communication device 504 and the second wireless communication device 506 may be configured to communicate sidelink signals on one or more of a plurality of beams 510a, 510b, 510c, 510d, 510e, 510f, 510g, and 510h. Although the beams 510a, 510b, 510c, 510d, 510e, 510f, 510g, and 510h are illustrated in FIG. 5 as being generated on the first wireless communication device 504, it should be understood that the same concepts described herein apply to beams generated on the second wireless communication device 506. For example, each of the first wireless communication device 504 and the second wireless communication device 506 may select one or more beams to transmit sidelink signals to the other wireless communication device. In some examples, due to channel reciprocity, the selected beam(s) on each of the first wireless communication device 504 and the second wireless communication device 506 may be used for both transmission and reception of sidelink signals. It should be noted that while some beams are illustrated as adjacent to one another, such an arrangement may be different in different aspects. In some examples, the first wireless communication device 504 and the second wireless communication device 506 may generate more or less beams distributed in different directions.

The number of beams on which a particular first wireless communication device 504 or the second wireless communication device 506 may simultaneously communicate may be defined based on NR SL standards and specifications and capabilities of the first wireless communication device 504 and the second wireless communication device 506. For example, the number of beams may be determined based on a number of antenna panels configured on the first wireless communication device 504 or the second wireless communication device 506. Each beam may be utilized, for example, to transmit a respective layer for MIMO communication.

In some examples, to select one or more beams for communication on a sidelink between the first wireless communication device 504 and the second wireless communication device 506, the first wireless communication device 504 may transmit a sidelink reference signal, such as a sidelink synchronization signal block (SSB) or sidelink channel state information (CSI) reference signal (RS), on each of the plurality of beams 510a, 510b, 510c, 510d, 510e, 510f, 510g, and 510h in a beam-sweeping manner towards the second wireless communication device 506. The second wireless communication device 506 searches for and identifies the beams based on the beam reference signals. The second wireless communication device 506 then performs beam measurements (e.g., reference signal received power (RSRP), signal-to-interference-plus-noise ratio (SINR), reference signal received quality (RSRQ), etc.) on the beam reference signals to determine the respective beam quality of each of the beams.

The second wireless communication device 506 may then transmit a beam measurement report to the first wireless communication device 504 indicating the beam quality of one or more of the measured beams. The first wireless communication device 504 may then select the particular beam(s) for communication between the first wireless communication device 504 and the second wireless communication device 506 on the sidelink based on the beam measurement report. For example, the first wireless communication device 504 may forward the beam measurement report to a base station for selection of the beam(s). The base station may then signal the selected beam(s) via, for example, a radio resource control (RRC) message or via a medium access control (MAC) control element (CE).

Each selected beam on one of the wireless communication devices (e.g., the first wireless communication device 504 or the second wireless communication device 506) may form a beam pair link (BPL) with a corresponding selected beam on the other wireless communication device. Thus, each BPL includes corresponding transmit and receive beams on the first wireless communication device 504 and the second wireless communication device 506. For example, a BPL may include a first transmit/receive beam on the first wireless communication device 504 and a second transmit/receive beam on the second wireless communication device 506. To increase the data rate, multiple BPLs can be used to facilitate spatial multiplexing of multiple data streams. In some examples, the different BPLs can include beams from different antenna panels.

Various aspects of the present disclosure will be described with reference to an OFDM waveform, schematically illustrated in FIG. 6. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 6:
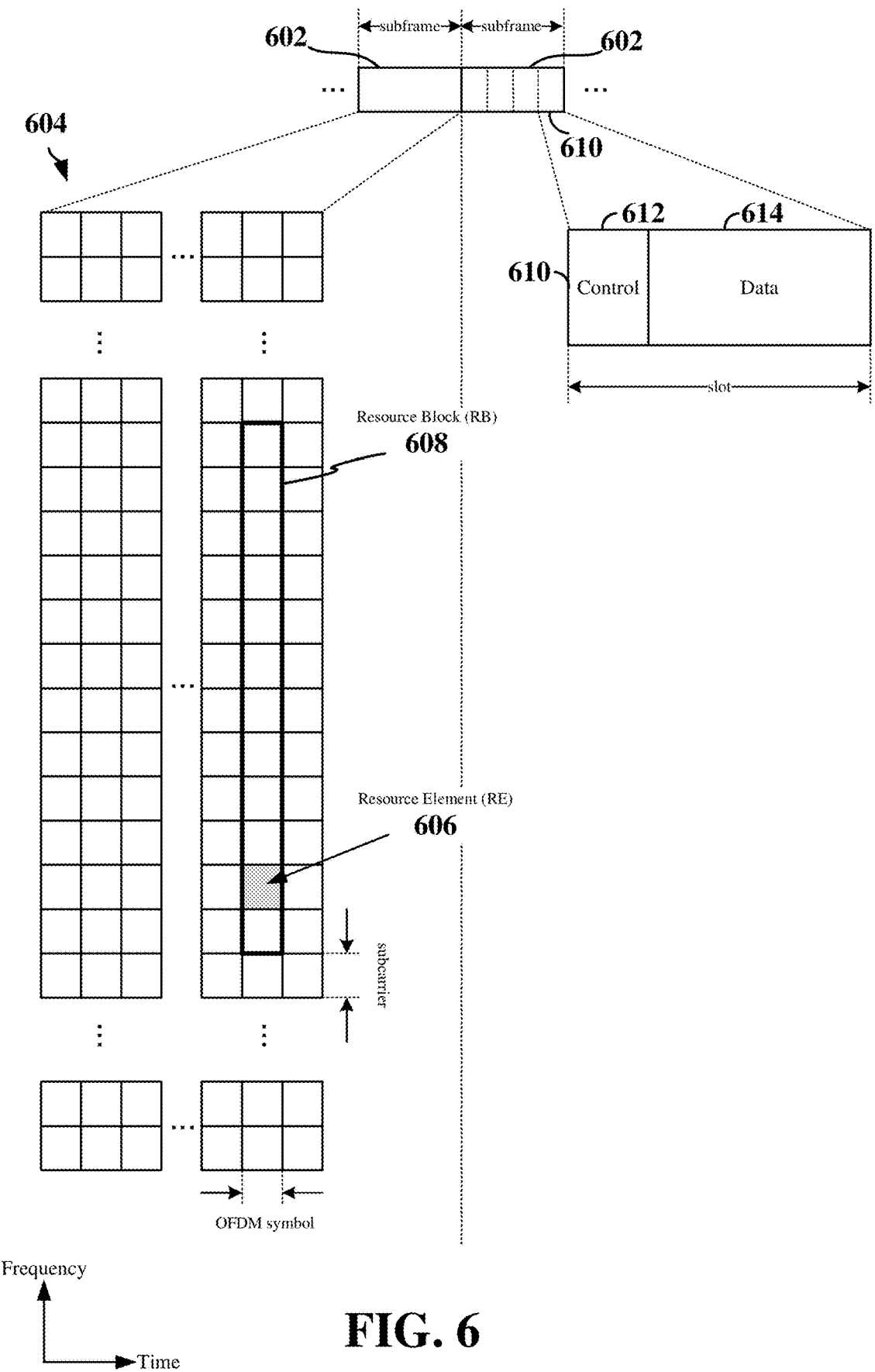
FIG. 6 is a diagram illustrating an example of a frame structure for use in a wireless communication network according to some aspects.

Referring now to FIG. 6, an expanded view of an exemplary subframe 602 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 604 may be used to schematically represent time-frequency resources for a given antenna port. That is, in a multiple-input-multiple-output (MIMO) implementation with multiple antenna ports available, a corresponding multiple number of resource grids 604 may be available for communication. The resource grid 604 is divided into multiple resource elements (REs) 606. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 608, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 608 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 606 within one or more sub-bands. Thus, a UE generally utilizes only a subset of the resource grid 604. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 608 is shown as occupying less than the entire bandwidth of the subframe 602, with some subcarriers illustrated above and below the RB 608. In a given implementation, the subframe 602 may have a bandwidth corresponding to any number of one or more RBs 608. Further, in this illustration, the RB 608 is shown as occupying less than the entire duration of the subframe 602, although this is merely one possible example.

Each 1 ms subframe 602 may consist of one or multiple adjacent slots. In the example shown in FIG. 6, one subframe 602 includes four slots 610, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 610 illustrates the slot 610 including a control region 612 and a data region 614. In general, the control region 612 may carry control channels, and the data region 614 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 6, the various REs 606 within a RB 608 may be scheduled to carry one or more physical channels, including control channels, shared channels, data channels, etc. Other REs 606 within the RB 608 may also carry pilots or reference signals. These pilots or reference signals may provide for a receiving device to perform channel estimation of the corresponding channel, which may enable coherent demodulation/detection of the control and/or data channels within the RB 608.

In some examples, the slot 610 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 606 (e.g., within the control region 612) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 606 (e.g., in the control region 612 or the data region 614) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 606 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request, i.e., request for the scheduling entity to schedule uplink transmissions. Here, in response to the scheduling request transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 606 (e.g., within the data region 614) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 606 within the data region 614 may be configured to carry other signals, such as one or more SIBs and DMRSs.

In an example of sidelink communication over a sidelink carrier via a PC5 interface, the control region 612 of the slot 610 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 614 of the slot 610 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 606 within slot 610. For example, HARQ feedback information may be transmitted in a physical sidelink feedback channel (PSFCH) within the slot 610 from the receiving sidelink device to the transmitting sidelink device. In addition, one or more reference signals, such as a sidelink SSB and/or a sidelink CSI-RS, may be transmitted within the slot 610.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 6 are not necessarily all of the channels or carriers that may be utilized between devices, and those of ordinary skill in the art will recognize that other channels or carriers may be utilized in addition to those illustrated, such as other traffic, control, and feedback channels.

Figure 7:
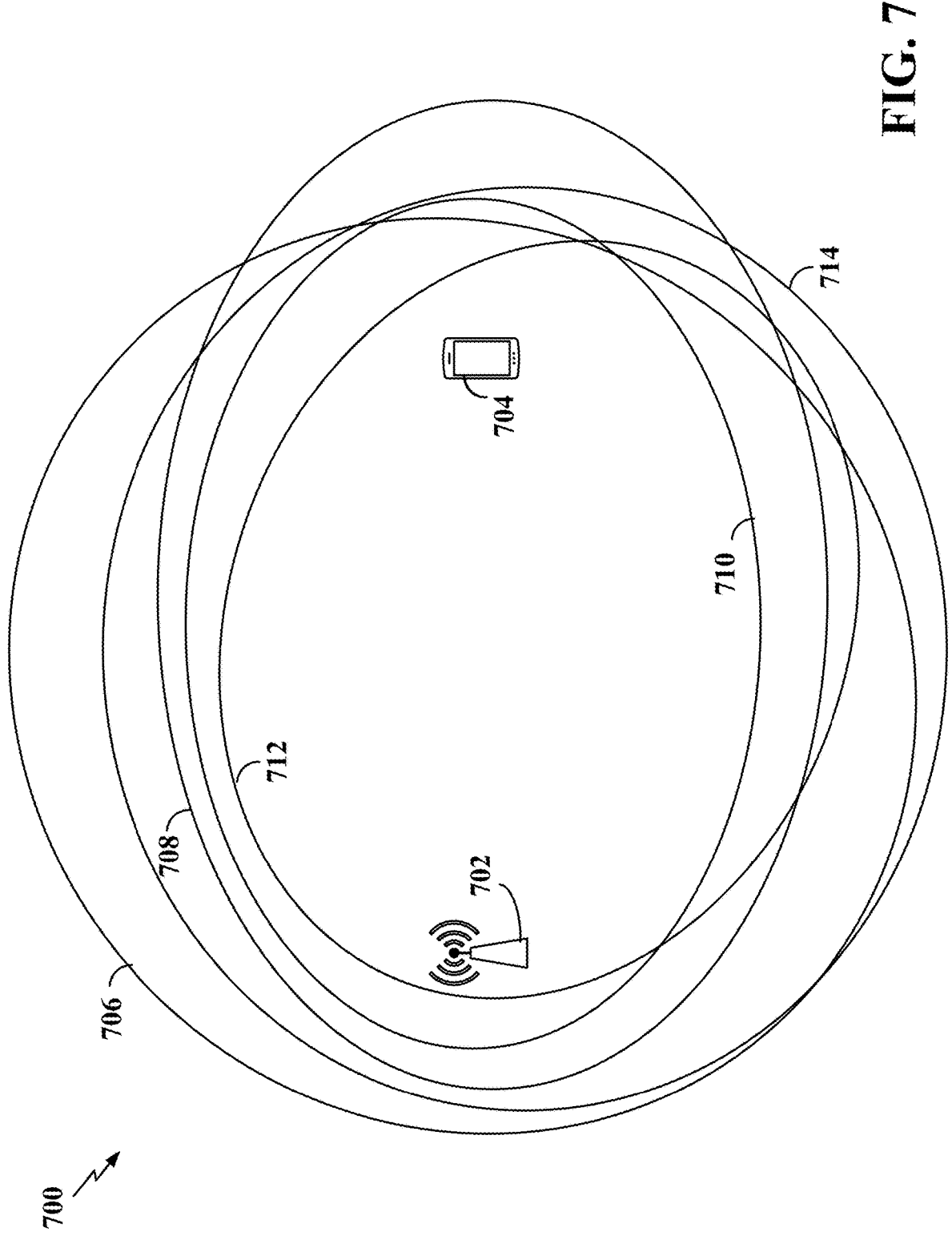
FIG. 7 is a conceptual diagram illustrating an example of a multi-component carrier transmission environment according to some aspects.

FIG. 7 is a conceptual diagram illustrating an example of a multi-component carrier transmission environment 700 according to some aspects. The multi-component carrier transmission environment 700 may include a base station 702 (e.g., a RAN node) and a UE 704. The base station 702 or scheduling entity may be similar to those illustrated in any of FIGS. 1-5. The UE 704 or scheduled entity may be similar to those illustrated in any of FIGS. 1-5. The multi-component carrier transmission environment 700 may also include a first component carrier 706, a second component carrier 708, a third component carrier 710, a fourth component carrier 712, and a fifth component carrier 714. Each of the first component carrier 706, the second component carrier 708, the third component carrier 710, the fourth component carrier 712, and the fifth component carrier 714 may be co-located with each other. The coverage of each of the first component carrier 706, the second component carrier 708, the third component carrier 710, the fourth component carrier 712, and the fifth component carrier 714 may differ since component carriers in different frequency bands may experience different path loss. In some aspects, the first component carrier 706 may be a primary component carrier (e.g. an anchor component carrier) and each of the second component carrier 708, the third component carrier 710, the fourth component carrier 712, and the fifth component carrier 714 may be secondary component carriers.

When carrier aggregation is configured, one or more of the secondary component carriers may be activated or added to the primary component carrier to form the serving component carriers serving the UE 704. In some examples, the base station 702 may add or remove one or more of the secondary component carriers to improve reliability of the connection to the UE 704 and/or increase the data rate. The primary component carrier may be changed upon a handover to another base station or another primary component carrier.

In some examples, the primary component carrier may be a low band component carrier, and the secondary component carriers may be high band component carriers. A low band (LB) component carrier has a frequency band lower than that of the high band component carrier. For example, the high band component carrier may use a mmWave component carrier, and the low band component carrier may use a component carrier in a band (e.g., sub-6 GHz band) lower than mmWave. In general, a mmWave component carrier can provide greater bandwidth than a low band component carrier.

In some examples, the primary component carrier or the primary component carrier and one or more secondary component carriers may form a group of two or more component carriers of a plurality of access component carriers or a plurality of sidelink component carriers associated with one or more TCI-states, one or more SRs, or one or more PL-RSs.

In some examples, the UE 704 may transmit an uplink signal (e.g., a PUCCH or PUSCH) on a component carrier using an uplink transmit power that may be controlled based on a path loss between the UE 704 and the base station 702. For example, the UE 704 may calculate the uplink transmit power for an uplink transmission based on the estimated or measured path loss, a transmit power control (TPC) command received from the base station 702, and other suitable parameters (e.g., the transport block size (TBS)). The path loss can be measured or estimated, for example, by measuring the received power of a path loss reference signal (PL-RS). Examples of PL-RS include, but are not limited to, SSBs and CSI-RSs. In 5G NR networks, the UE 704 may maintain up to four PL-RSs per serving cell. The maintained PL-RSs may include PL-RSs configured by the serving cell via radio resource control (RRC) signaling or MAC-CE activation, and default PL-RSs on the UE 704.

In some aspects, carrier aggregation may be configured for the sidelink. As similarly described with respect to the access link, with carrier aggregation for the sidelink, one or more of the secondary component carriers may be activated or added to the primary component carrier to form the serving component carriers serving a scheduled entity (e.g., UE). In some examples, the scheduling entity (e.g., UE) may add or remove one or more of the secondary component carriers to improve reliability of the connection to another UE and/or increase the data rate.

In some examples, the UE 704 may utilize one or more transmission configuration indicator states (TCI-states) or one or more spatial relations (SRs) for multi-component carrier communication. The UE 704 may receive a message, from the base station 702, indicating one or more transmission configuration indicator states (TCI-states) or one or more spatial relations (SRs) and including an index identifying a group of two or more component carriers of a plurality of access component carriers associated with the one or more TCI-states or the one or more SRs. The index may also identify a group of two or more component carriers of a plurality of sidelink component carriers associated with the one or more TCI-states or the one or more SRs. The UE 704 may update the one or more TCI-states or the one or more SRs for the group of two or more component carriers associated with the access link, the sidelink, or both for the multi-component carrier communication based on the message.

In some examples, the UE 704 may utilize one or more pathloss reference signal (PL-RSs) for multi-component carrier communication. The UE 704 may receive a message, from the base station 702, indicating one or more PL-RSs and including an index identifying a group of two or more component carriers of a plurality of access component carriers associated with the one or more PL-RSs. The index may also identify a group of two or more component carriers of a plurality of sidelink component carriers associated with the one or more PL-RSs. The UE 704 may update the one or more PL-RSs for the group of two or more component carriers associated with the access link, the sidelink, or both for the multi-component carrier communication based on the message.

Figure 8:
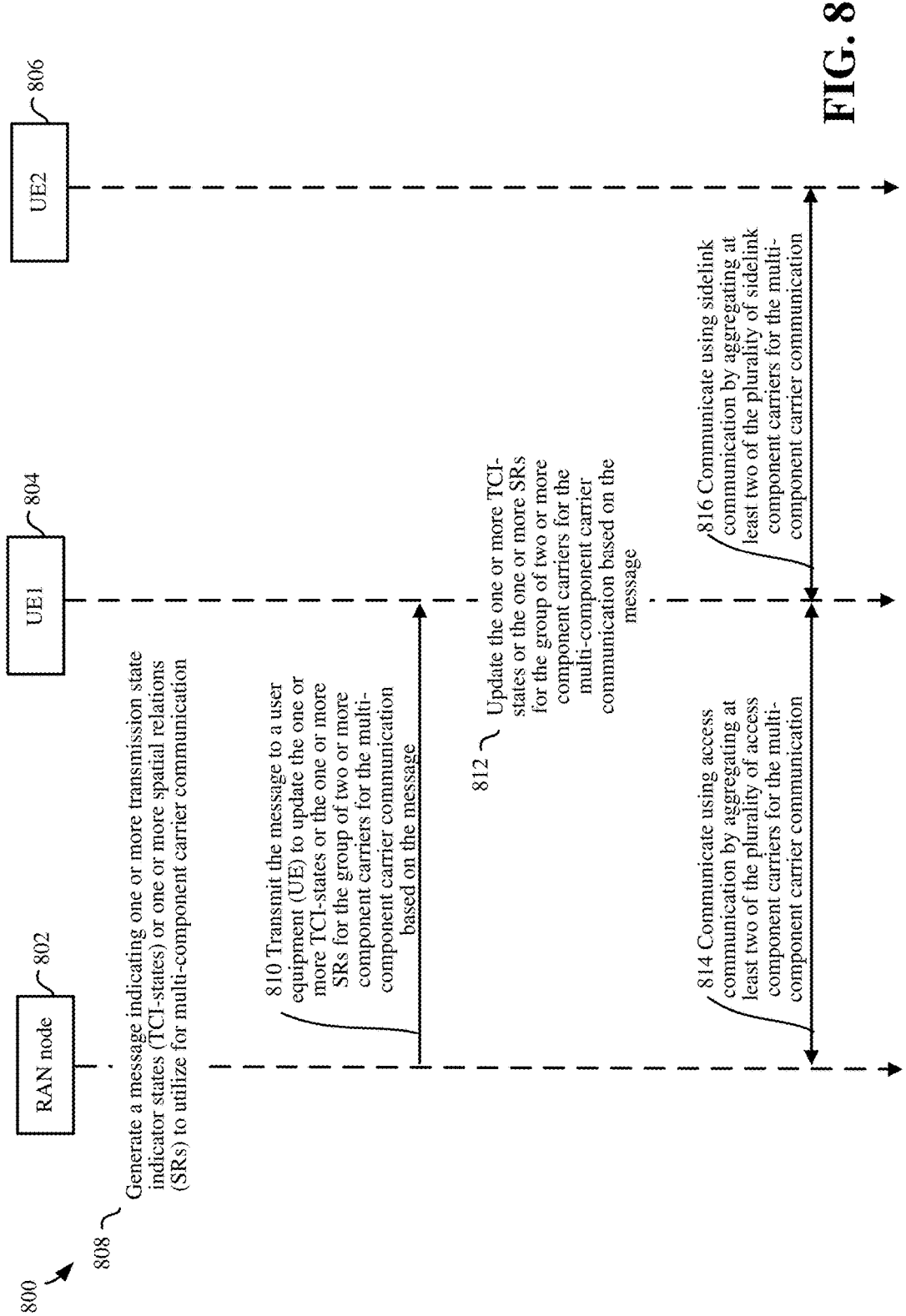
FIG. 8 is a signaling diagram illustrating an example of beam indication according to some aspects.

FIG. 8 is a signaling diagram illustrating an example of beam indication according to some aspects. In the example shown in FIG. 8, a RAN node 802 is in wireless communication with a first wireless communication device (UE1) 804 over an access link. The first wireless communication device (UE1) 804 may be in wireless communication with a second wireless communication device (UE2) 806 over a sidelink. The RAN node 802 may correspond to any of the entities, gNodeBs, UEs, V2X devices, or D2D devices shown in FIGS. 1-5 and 7. The UE1 804 and/or the UE2 806 may correspond to any of the entities, gNodeBs, UEs, V2X devices, or D2D devices shown in FIGS. 1-5 and 7.

At 708, the RAN node 802, which may be a transmitting wireless communication device, generates a message indicating one or more transmission configuration indicator states (TCI-states) or one or more spatial relations (SRs) to utilize for multi-component carrier communication on the access link or the sidelink. The message may include at least one of a medium access control (MAC) control element (MAC-CE), or downlink control information (DCI).

The TCI-states or SRs may indicate the spatial property (e.g., beam direction and/or beam width) of a transmit beams to be utilized by a wireless communication device. For example, for access communication, the TCI-state may include quasi co-location (QCL) information (e.g., QCL-Type D) referencing an access SSB beam or access CSI-RS transmit beam on the transmitting wireless communication device. Similarly, the SRI may indicate a spatial relation between an access SSB or access CSI-RS beam and an uplink transmit beam utilized by the UE (e.g., UE1 804) for uplink transmissions. In this example, a wireless communication device may identify the selected uplink transmit beam having a spatial direction in the same direction as the indicated access SSB or CSI-RS beam. Similarly, for sidelink communication, the TCI states or SRs may indicate the sidelink transmit beams to be utilized for communication on the sidelink between UEs (e.g., between UE1 804 and UE2 806). Subsequently, the receive beams may be determined by the BPL.

The message may include one of a TCI-state activation and deactivation message or an SRI activation and deactivation message. For example, the message may include a binary string of one or more "zeros" and one or more "ones" for activating or deactivating each of a plurality of TCI-states including the one or more TCI states or each of a plurality of SRs including the one or more SRs. The message may also include an index identifying a group of two or more component carriers of a plurality of access component carriers or a plurality of sidelink component carriers associated with the one or more TCI-states or the one or more SRs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first TCI-states or first SRs to utilize for access multi-component carrier communication. The first entry may include a first index identifying a first group of two or more component carriers of the plurality of access component carriers associated with the first TCI-states or the first SRs. Additionally, or alternatively, the message may include a second entry indicating second TCI-states or second SRs to utilize for sidelink multi-component carrier communication. The second entry may include a second index identifying a second group of two or more component carriers of the plurality of sidelink component carriers associated with the second TCI-states or the second SRs.

At 810, the RAN node 802 transmits the message to a user equipment (UE) to update the one or more TCI-states or the one or more SRs for the group of two or more component carriers for the multi-component carrier communication based on the message. For example, the RAN node 802 may transmit the message to the UE1 804 to update the one or more TCI-states or the one or more SRs for the group of two or more component carriers for the multi-component carrier communication based on the message. It should be understood that the transmitting device can be either a RAN node, as shown in FIG. 8, or a UE. Thus, for the sidelink, a UE may receive the message from a RAN node, and subsequently transmit the information provided in the message to another UE on the sidelink using SCI. In other examples, a UE may autonomously transmit a message via SCI to update one or more TCI-states or one or more SRs for a group of two or more sidelink component carriers to another UE on the sidelink.

At 812, the UE1 804 updates the one or more TCI-states or the one or more SRs for the group of two or more component carriers for the multi-component carrier communication based on the message. For example, in response to receiving the message from the RAN node 802, the UE1 804 may update the one or more TCI-states or the one or more SRs for the group of two or more component carriers for the multi-component carrier communication based on the message. In some aspects, when a reference signal source of a TCI-state of the one or more TCI-states or an SRI of the one or more SRs in the message is associated with access communication, the UE1 804 may update the one or more TCI-states or the one or more SRs for the group of two or more component carriers of the plurality of access carriers. In some aspects, when a reference signal source of a TCI-state of the one or more TCI-states or an SRI of the one or more SRs in the message is associated with sidelink communication, the UE1 804 may update the one or more TCI-states or the one or more SRs for the group of two or more component carriers for the plurality of sidelink carriers.

At 814, the UE1 804 communicates using access communication by aggregating at least two of the plurality of access component carriers for the multi-component carrier communication. For example, the UE1 804 may communicate with the RAN node 802 using access communication by aggregating at least two of the plurality of access component carriers for the multi-component carrier communication. In some examples, the UE1 804 may communicate with the RAN node 802 on one or more beams on each of the aggregated access component carriers, as indicated in the message. For example, the message may indicate a downlink receive beam or a transmit uplink beam to use on one or more of the aggregated access component carriers.

At 816, the UE1 804 communicates using sidelink communication by aggregating at least two of the plurality of the sidelink component carriers for the sidelink multi-component carrier communication. For example, the UE1 804 may communicate with the UE2 806 using sidelink communication by aggregating at least two of the plurality of the sidelink component carriers for the sidelink multi-component carrier communication. In some examples, the UE1 804 may communicate with the UE2 806 on one or more beams on each of the aggregated sidelink component carriers, as indicated in the message. For example, the message may indicate a transmit sidelink beam to use by the UE1 804 or the UE2 806 on one or more of the aggregated sidelink component carriers.

Figure 9:
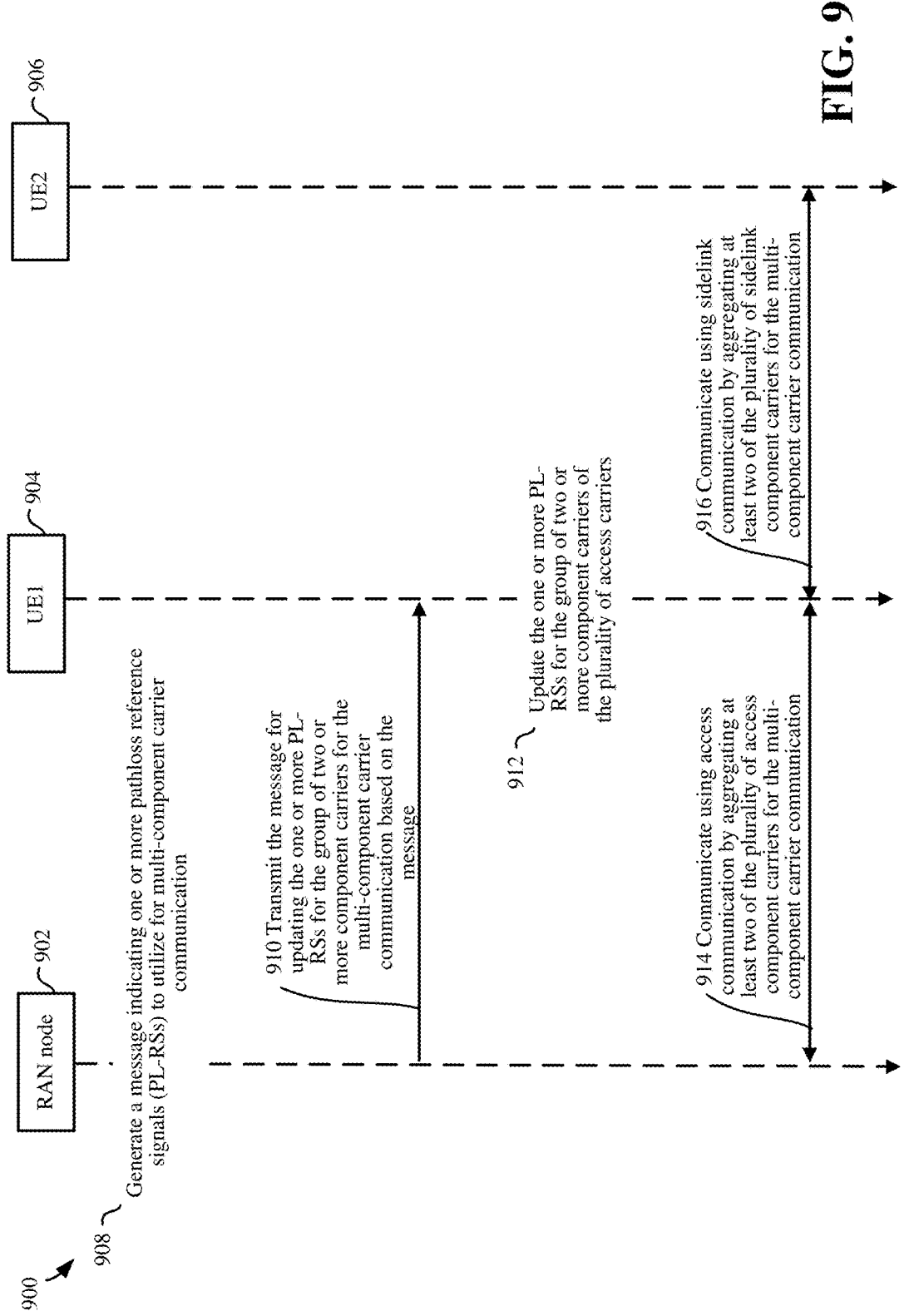
FIG. 9 is another signaling diagram illustrating an example of pathloss reference signal indication according to some aspects.

FIG. 9 is a signaling diagram illustrating an example of path loss reference signal indication for multi-component carrier communication according to some aspects. In the example shown in FIG. 9, a RAN node 902 is in wireless communication with a first wireless communication device (UE1) 904 over an access link. The first wireless communication device (UE1) 904 may be in wireless communication with a second wireless communication device (UE2) 906 over a sidelink. Each of the RAN node 902, the UE1 904, and the UE2 906 may correspond to any of the entities, gNodeBs, UEs, V2X device, or D2D devices shown in FIGS. 1-5, 7, and 8.

At 908, the RAN node 902, which may be a transmitting wireless communication device, generates a message indicating one or more pathloss reference signals (PL-RSs) to utilize for multi-component carrier communication. The message may include at least one of a medium access control (MAC) control element (MAC-CE), or downlink control information (DCI). It should be understood that the transmitting device can be either a RAN node or a UE. Thus, for the sidelink, a UE may receive the message from a RAN node, and subsequently transmit the information provided in the message to another UE in the sidelink using SCI.

The message may include one of a PL-RS activation and deactivation message. For example, the message may include a binary string of one or more "zeros" and one or more "ones" for activating or deactivating each of a plurality of PL-RSs. The message may also include an index identifying a group of two or more component carriers of a plurality of access component carriers or a plurality of sidelink component carriers associated with the one or more PL-RSs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first PL-RSs to utilize for access multi-component carrier communication. The first entry may include a first index identifying a first group of two or more component carriers of the plurality of access component carriers associated with the first PL-RSs. Additionally, or alternatively, the message may include a second entry indicating second PL-RSs to utilize for sidelink multi-component carrier communication. The second entry may include a second index identifying a second group of two or more component carriers of the plurality of sidelink component carriers associated with the second PL-RSs.

At 910, the RAN node 902 transmits the message for updating the one or more PL-RSs for the group of two or more component carriers for the multi-component carrier communication based on the message. For example, the RAN node 902 may transmit the message to the UE1 904 to update the one or more PL-RSs for the group of two or more component carriers for the multi-component carrier communication based on the message. It should be understood that the transmitting device can be either a RAN node, as shown in FIG. 8, or a UE. Thus, for the sidelink, a UE may receive the message from a RAN node, and subsequently transmit the information provided in the message to another UE on the sidelink using SCI. In other examples, a UE may autonomously transmit a message via SCI to update one or more PL-RS for a group of two or more sidelink component carriers to another UE on the sidelink.

At 912, the UE1 904 update the one or more PL-RSs for the group of two or more component carriers for the multi-component carrier communication based on the message. For example, in response to receiving the message from the RAN node 902, the UE1 904 may update the one or more PL-RSs for the group of two or more component carriers for the multi-component carrier communication based on the message. In some aspects, when a reference signal source of a PL-RS of the one or more PL-RSs in the message is associated with access communication, the UE1 904 updates the one or more PL-RSs for the group of two or more component carriers of the plurality of access carriers. In some aspects, when a reference signal source of a PL-RS of the one or more PL-RSs in the message is associated with sidelink communication, the UE1 904 updates the one or more PL-RSs for the group of two or more component carriers for the plurality of sidelink carriers.

At 914, the UE1 904 communicates using access communication by aggregating at least two of the plurality of access component carriers for the multi-component carrier communication. For example, the UE1 904 may communicate with the RAN node 902 using access communication by aggregating at least two of the plurality of access component carriers for the multi-component carrier communication. At 916, the UE1 904 communicates using sidelink communication by aggregating at least two of the plurality of the sidelink component carriers for the sidelink multi-component carrier communication. For example, the UE1 904 may communicate with the UE2 906 using sidelink communication by aggregating at least two of the plurality of the sidelink component carriers for the sidelink multi-component carrier communication.

Figure 10:
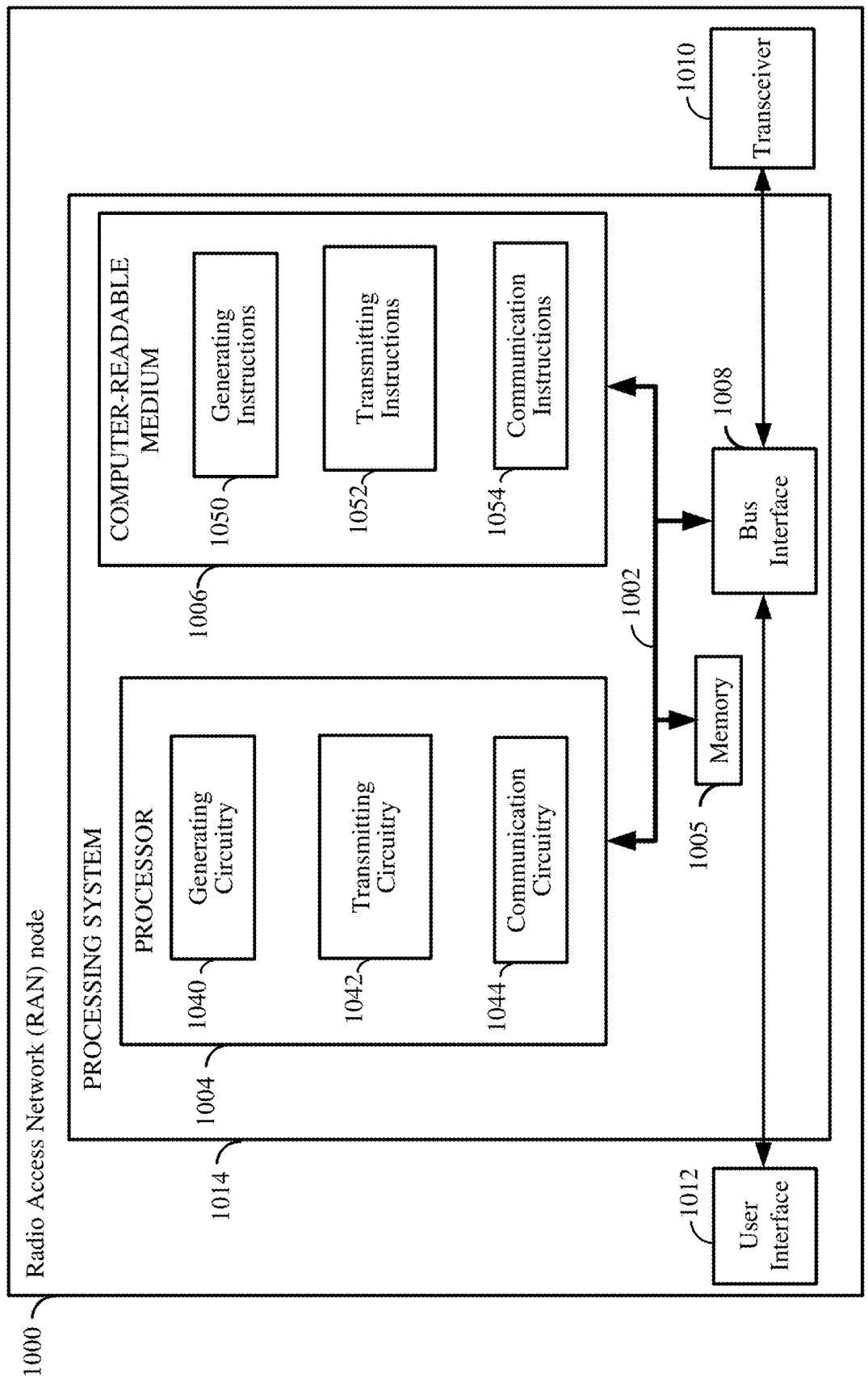
FIG. 10 is a block diagram illustrating an example of a hardware implementation for a radio access network (RAN) entity employing a processing system according to some aspects.

FIG. 10 is a block diagram illustrating an example of a hardware implementation for a radio access network (RAN) node employing a processing system 1014. For example, the RAN node 1000 may be any of the base stations (e.g., gNB or eNB) illustrated in any one or more of FIGS. 1-5, 7, 8, and 9.

The RAN node 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 1000 may be configured to perform any one or more of the functions described herein. That is, the processor 1004, as utilized in a RAN node 1000, may be used to implement any one or more of the processes described herein. The processor 1004 may in some instances be implemented via a baseband or modem chip and in other implementations, the processor 1004 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), and computer-readable media (represented generally by the computer-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). A user interface 1012 (e.g., keypad, display, speaker, microphone, joystick) may also be provided.

The processor 1004 is responsible for managing the bus 1002 and general processing, including the execution of software stored on the computer-readable storage medium 1006. The software, when executed by the processor 1004, causes the processing system 1014 to perform the various functions described herein for any particular apparatus. The computer-readable storage medium 1006 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1006.

The computer-readable storage medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1006 may reside in the processing system 1014, external to the processing system 1014, or distributed across multiple entities including the processing system 1014. The computer-readable storage medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include generating circuitry 1040 configured to generate a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. Additionally, or alternatively, the generating circuitry 1040 may be configured to generate a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The generating circuitry 1040 may further be configured to execute generating instructions 1050 stored in the computer-readable storage medium 1006 to implement any of the one or more of the functions described herein.

The processor 1004 may also include transmitting circuitry 1042 configured to transmit, via the transceiver 1010, the message to a user equipment (UE) to update the one or more TCI-states or the one or more SRs for the group of two or more component carriers for the multi-component carrier communication based on the message. Additionally, or alternatively, the transmitting circuitry 1042 may be configured to transmit, via the transceiver 1010, the message for updating the one or more PL-RSs for the group of two or more component carriers for the multi-component carrier communication based on the message. The transmitting circuitry 1042 may further be configured to execute transmitting instructions 1052 stored in the computer-readable storage medium 1006 to implement any of the one or more of the functions described herein.

The processor 1004 may further include communication circuitry 1044 configured to utilize a communication link and communicate with a user equipment using access communication by aggregating at least two of the plurality of access component carriers for the multi-component carrier communication. The communication circuitry 1044 may further be configured to execute communication instructions 1054 stored in the computer-readable storage medium 1006 to implement any of the one or more of the functions described herein.

Figure 11:
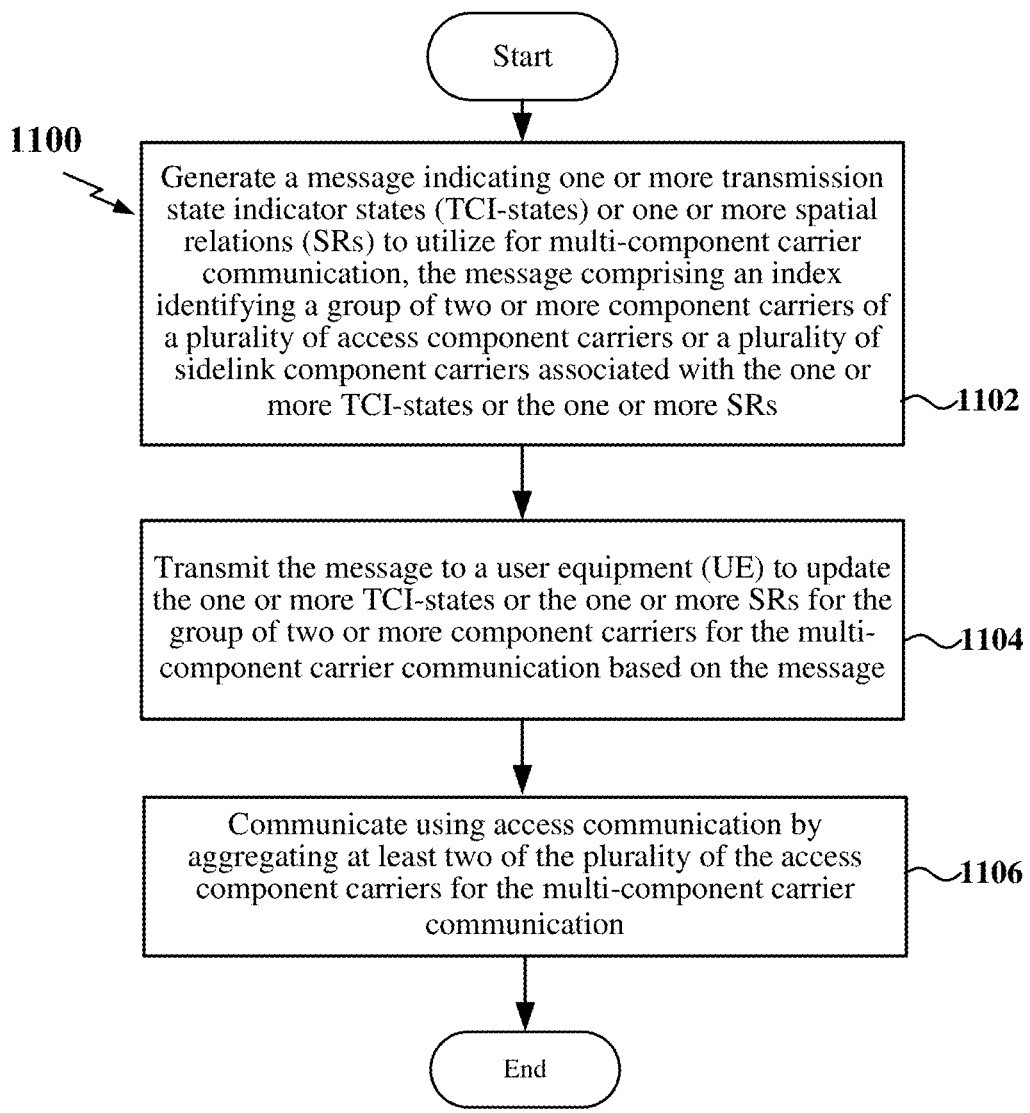
FIG. 11 is a flow chart of a method for generating and transmitting transmission configuration indicator states (TCI-states) or spatial relations (SRs) to utilize for multi-component communication according to some aspects.

FIG. 11 is a flow chart 1100 of a method for generating and transmitting transmission configuration indicator states (TCI-states) or spatial relations (SRs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the RAN node 1000, as described above and illustrated in FIG. 10, by a processor or processing system, or by any suitable means for carrying out the described functions.

At block 1102, the RAN node 1000 generates a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. The message may include at least one of a medium access control (MAC) control element (MAC-CE), or downlink control information (DCI).

The TCI-states or SRs may indicate the spatial property (e.g., beam direction and/or beam width) of a transmit beams to be utilized by a wireless communication device. For example, for access communication, the TCI-state may include quasi co-location (QCL) information (e.g., QCL-Type D) referencing an access SSB beam or access CSI-RS transmit beam on the transmitting wireless communication device. Similarly, the SRI may indicate a spatial relation between an access SSB or access CSI-RS beam and an uplink transmit beam utilized by the UE for uplink transmissions. In this example, a wireless communication device may identify the selected uplink transmit beam having a spatial direction in the same direction as the indicated access SSB or CSI-RS beam. Similarly, for sidelink communication, the TCI states or SRs may indicate the sidelink transmit beams to be utilized for communication on the sidelink between UEs. Subsequently, the receive beams may be determined by the BPL.

The message may include one of a TCI-state activation and deactivation message or an SRI activation and deactivation message. For example, the message may include a binary string of one or more "zeros" and one or more "ones" for activating or deactivating each of a plurality of TCI-states including the one or more TCI states or each of a plurality of SRs including the one or more SRs. The message may also include an index identifying a group of two or more component carriers of a plurality of access component carriers or a plurality of sidelink component carriers associated with the one or more TCI-states or the one or more SRs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first TCI-states or first SRs to utilize for access multi-component carrier communication. The first entry may include a first index identifying a first group of two or more component carriers of the plurality of access component carriers associated with the first TCI-states or the first SRs. Additionally, or alternatively, the message may include a second entry indicating second TCI-states or second SRs to utilize for sidelink multi-component carrier communication. The second entry may include a second index identifying a second group of two or more component carriers of the plurality of sidelink component carriers associated with the second TCI-states or the second SRs.

The generation of the message indicating one or more transmission configuration indicator states (TCI-states) or one or more spatial relations (SRs) to utilize for multi-component carrier communication may be further described with respect to the description of FIGS. 1-5, 7, 8, and 9 provided herein. The generating circuitry 1040 shown and described above in connection with FIG. 10, may provide a means to generate the message indicating one or more transmission configuration indicator states (TCI-states) or one or more spatial relations (SRs) to utilize for multi-component carrier communication.

At block 1104, the RAN node 1000 transmits the message to a user equipment (UE) to update the one or more TCI-states or the one or more SRs for the group of two or more component carriers for the multi-component carrier communication based on the message. For example, the RAN node 802 may transmit the message to the UE1 804 to update the one or more TCI-states or the one or more SRs for the group of two or more component carriers for the multi-component carrier communication based on the message. It should be understood that the transmitting device can be either a RAN node or a UE. Thus, for the sidelink, a UE may receive the message from a RAN node, and subsequently transmit the information provided in the message to another UE in the sidelink using SCI. The transmitting circuitry 1042, together with the transceiver 1010, shown and described above in connection with FIG. 10 may provide a means to transmit the message to a user equipment (UE) to update the one or more TCI-states or the one or more SRs for the group of two or more component carriers for the multi-component carrier communication based on the message.

At block 1106, the RAN node 1000 communicates using access communication by aggregating at least two of the plurality of access component carriers for the multi-component carrier communication. For example, the UE1 804 may communicate with the RAN node 802 using access communication by aggregating at least two of the plurality of access component carriers for the multi-component carrier communication. In some examples, the UE1 804 may communicate with the RAN node 802 on one or more beams on each of the aggregated access component carriers, as indicated in the message. For example, the message may indicate a downlink receive beam or a transmit uplink beam to use on one or more of the aggregated access component carriers. The communication circuitry 1044, together with the transceiver 1010, shown and described above in connection with FIG. 10 may provide a means to communicate using access communication by aggregating at least two of the plurality of access component carriers.

Figure 12:
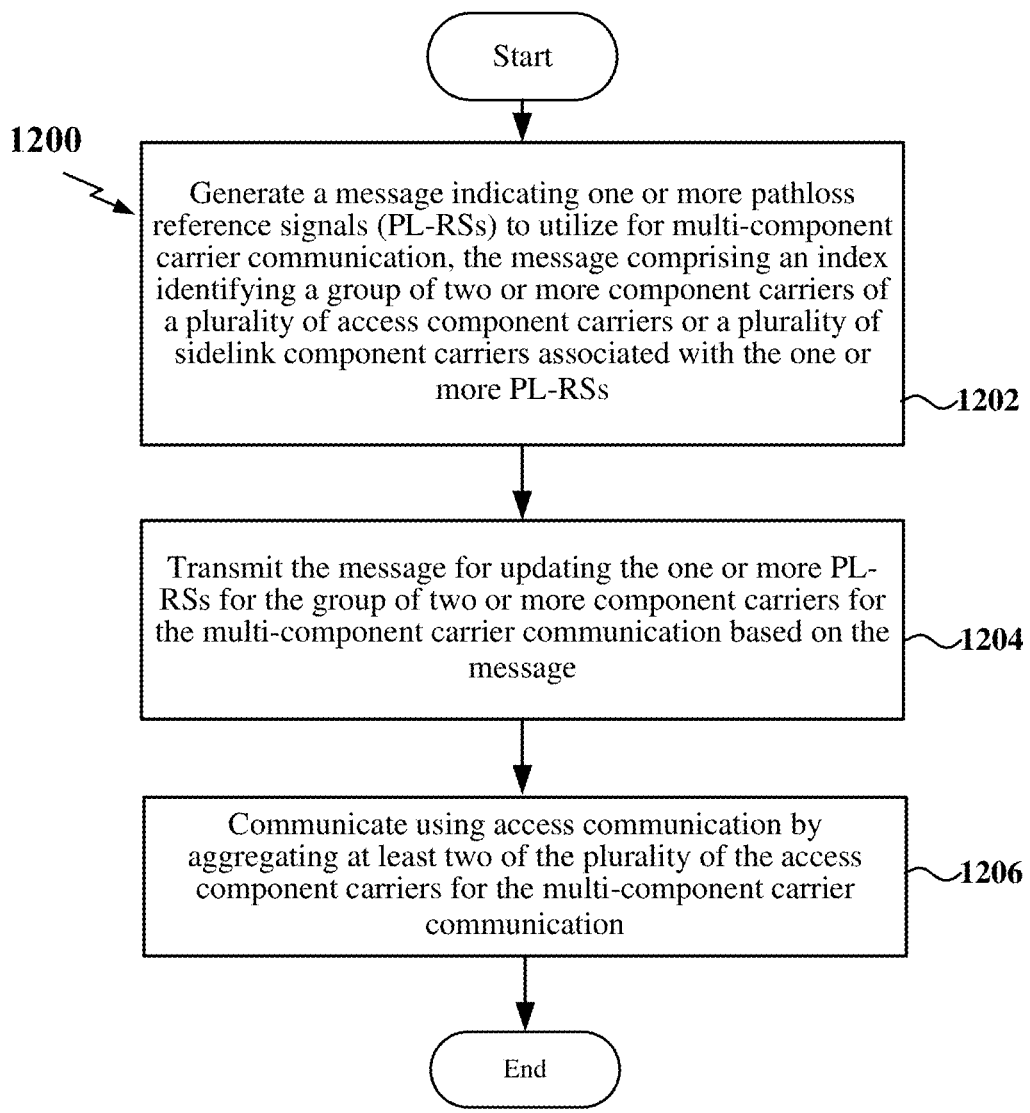
FIG. 12 is a flow chart of a method for generating and transmitting pathloss reference signals (PL-RSs) to utilize for multi-component communication according to some aspects.

FIG. 12 is a flow chart 1200 of a method for generating and transmitting pathloss reference signals (PL-RSs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the RAN node 1000, as described above and illustrated in FIG. 10, by a processor or processing system, or by any suitable means for carrying out the described functions.

At block 1202, the RAN node 1000 generates a message indicating one or more pathloss reference signals (PL-RSs) to utilize for multi-component carrier communication. The message comprising an index identifying a group of two or more component carriers of a plurality of access component carriers or a plurality of sidelink component carriers associated with the one or more PL-RSs. The message may include at least one of a medium access control (MAC) control element (MAC-CE), or downlink control information (DCI). It should be understood that the transmitting device can be either a RAN node or a UE. Thus, for the sidelink, a UE may receive the message from a RAN node, and subsequently transmit the information provided in the message to another UE in the sidelink using SCI.

The message may include one of a PL-RS activation and deactivation message. For example, the message may include a binary string of one or more "zeros" and one or more "ones" for activating or deactivating each of a plurality of PL-RSs. The message may also include an index identifying a group of two or more component carriers of a plurality of access component carriers or a plurality of sidelink component carriers associated with the one or more PL-RSs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first PL-RSs to utilize for access multi-component carrier communication. The first entry may include a first index identifying a first group of two or more component carriers of the plurality of access component carriers associated with the first PL-RSs. Additionally, or alternatively, the message may include a second entry indicating second PL-RSs to utilize for sidelink multi-component carrier communication. The second entry may include a second index identifying a second group of two or more component carriers of the plurality of sidelink component carriers associated with the second PL-RSs.

The generation of the message indicating one or more PL-RSs to utilize for multi-component carrier communication may be further described with respect to the description of FIGS. 1-5, 7, 8, and 9 provided herein. The generating circuitry 1040 shown and described above in connection with FIG. 10, may provide a means to generate the message indicating one or more PL-RSs to utilize for multi-component carrier communication.

At block 1204, the RAN node 1000 transmits the message for updating the one or more PL-RSs for the group of two or more component carriers for the multi-component carrier communication based on the message. For example, the RAN node 1000 may transmit the message to a UE to update the one or more PL-RSs for the group of two or more component carriers for the multi-component carrier communication based on the message. The transmitting circuitry 1042, together with the transceiver 1010, shown and described above in connection with FIG. 10, may provide a means to transmit the message for updating the one or more PL-RSs for the group of two or more component carriers for the multi-component carrier communication based on the message.

At block 1206, the RAN node 1000 communicates using access communication by aggregating at least two of the plurality of access component carriers for the multi-component carrier communication. For example, the UE1 804 may communicate with the RAN node 802 using access communication by aggregating at least two of the plurality of access component carriers for the multi-component carrier communication. In some examples, the UE1 804 may communicate with the RAN node 802 on one or more beams on each of the aggregated access component carriers, as indicated in the message. The communication circuitry 1044, together with the transceiver 1010, shown and described above in connection with FIG. 10 may provide a means to communicate using access communication by aggregating at least two of the plurality of component carriers.

Figure 13:
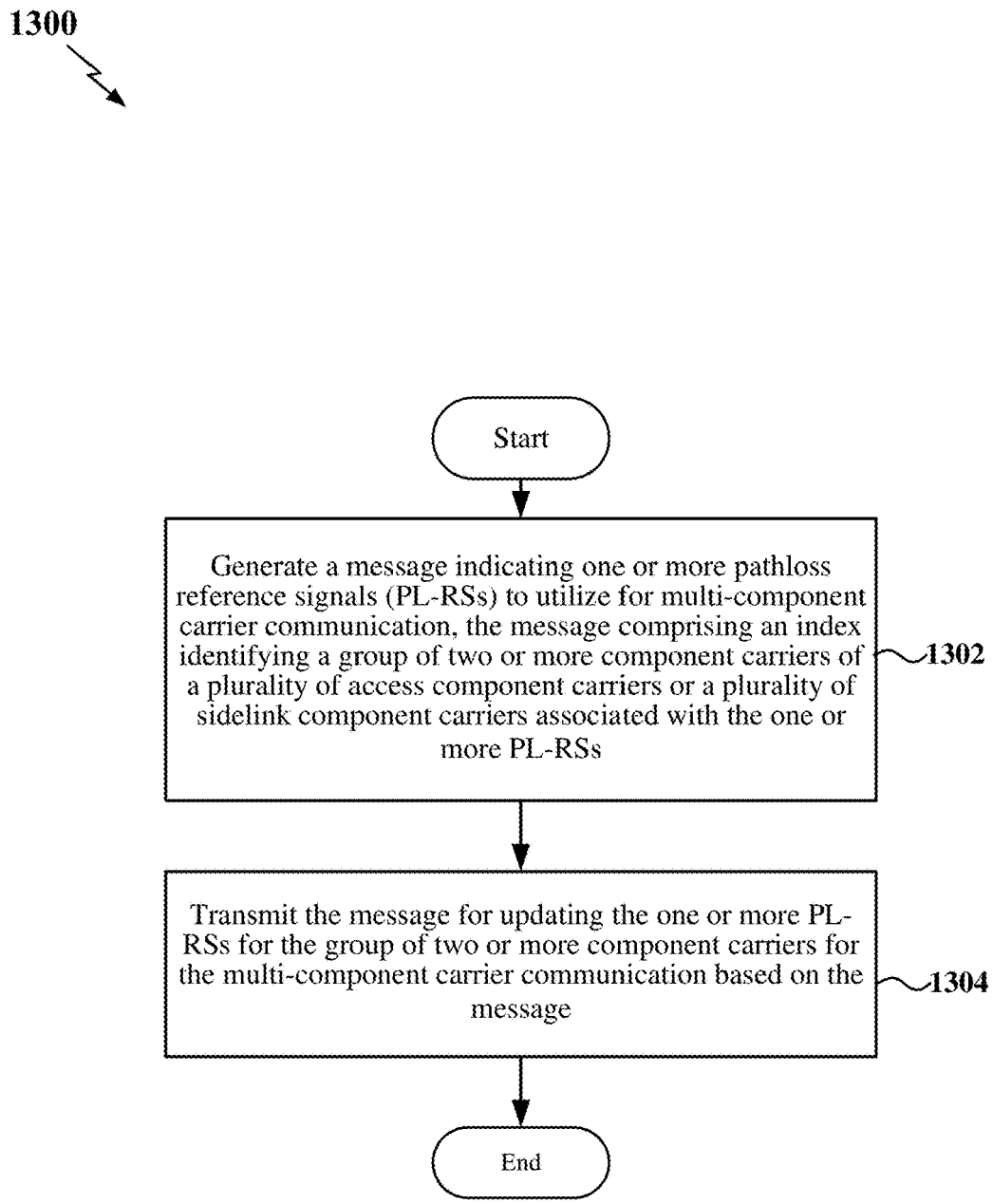
FIG. 13 is a flow chart of another method for generating and transmitting pathloss reference signals (PL-RSs) to utilize for multi-component communication according to some aspects.

FIG. 13 is a flow chart of another method for generating and transmitting pathloss reference signals (PL-RSs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the RAN node 1000, as described above and illustrated in FIG. 10, by a processor or processing system, or by any suitable means for carrying out the described functions.

At block 1302, the RAN node 1000 generates a message indicating one or more pathloss reference signals (PL-RSs) to utilize for multi-component carrier communication. The message comprising an index identifying a group of two or more component carriers of a plurality of access component carriers or a plurality of sidelink component carriers associated with the one or more PL-RSs. The message may include at least one of a medium access control (MAC) control element (MAC-CE), or downlink control information (DCI). It should be understood that the transmitting device can be either a RAN node or a UE. Thus, for the sidelink, a UE may receive the message from a RAN node, and subsequently transmit the information provided in the message to another UE in the sidelink using SCI.

The message may include one of a PL-RS activation and deactivation message. For example, the message may include a binary string of one or more "zeros" and one or more "ones" for activating or deactivating each of a plurality of PL-RSs. The message may also include an index identifying a group of two or more component carriers of a plurality of access component carriers or a plurality of sidelink component carriers associated with the one or more PL-RSs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first PL-RSs to utilize for access multi-component carrier communication. The first entry may include a first index identifying a first group of two or more component carriers of the plurality of access component carriers associated with the first PL-RSs. Additionally, or alternatively, the message may include a second entry indicating second PL-RSs to utilize for sidelink multi-component carrier communication. The second entry may include a second index identifying a second group of two or more component carriers of the plurality of sidelink component carriers associated with the second PL-RSs.

The generation of the message indicating one or more PL-RSs to utilize for multi-component carrier communication may be further described with respect to the description of FIGS. 1-5, 7-9, 11 and 12 provided herein. The generating circuitry 1040 shown and described above in connection with FIG. 10, may provide a means to generate the message indicating one or more PL-RSs to utilize for multi-component carrier communication.

At block 1304, the RAN node 1000 transmits the message for updating the one or more PL-RSs for the group of two or more component carriers for the multi-component carrier communication based on the message. For example, the RAN node 1000 may transmit the message to a UE to update the one or more PL-RSs for the group of two or more component carriers for the multi-component carrier communication based on the message. The transmitting circuitry 1042, together with the transceiver 1010, shown and described above in connection with FIG. 10, may provide a means to transmit the message for updating the one or more PL-RSs for the group of two or more component carriers for the multi-component carrier communication based on the message.

At block 1306, the RAN node 1000 communicates using access communication by aggregating at least two of the plurality of access component carriers for the multi-component carrier communication. For example, the UE1 804 may communicate with the RAN node 802 using access communication by aggregating at least two of the plurality of access component carriers for the multi-component carrier communication. In some examples, the UE1 804 may communicate with the RAN node 802 on one or more beams on each of the aggregated access component carriers, as indicated in the message. The communication circuitry 1044, together with the transceiver 1010, shown and described above in connection with FIG. 10 may provide a means to communicate using access communication by aggregating at least two of the plurality of component carriers.

Figure 14:
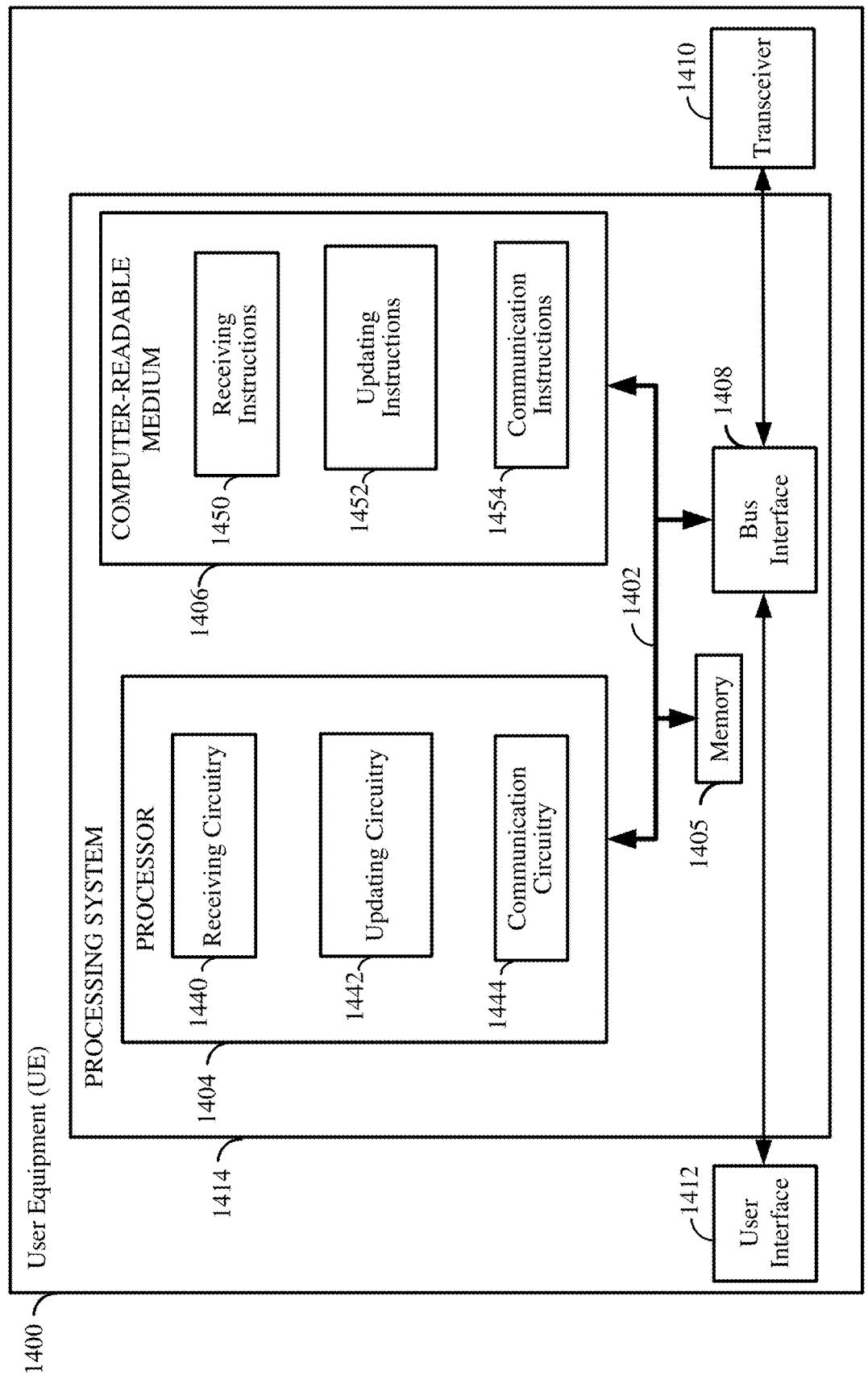
FIG. 14 is a block diagram illustrating an example of a hardware implementation for a user equipment (UE) employing a processing system according to some aspects.

FIG. 14 is a block diagram illustrating an example of a hardware implementation for a UE 1400 (e.g., a wireless communication device) employing a processing system 1414 according to some aspects. For example, the UE 1400 may correspond to any of the UEs shown and described above in any one or more of FIGS. 1-5, 7, 8, and/or 9.

In accordance with various aspects of the disclosure, an element, or any portion of an element, or any combination of elements may be implemented with a processing system 1414 that includes one or more processors 1404. The processing system 1414 may be substantially the same as the processing system 1014 illustrated in FIG. 10, including a bus interface 1408, a bus 1402, a processor 1404, and a computer-readable storage medium 1406. Furthermore, the UE 1400 may include a user interface 1412 and a transceiver 1410 substantially similar to those described above in FIG. 10. That is, the processor 1404, as utilized in a UE 1400, may be used to implement any one or more of the processes described herein.

In some aspects of the disclosure, the processor 1404 may include circuitry configured for various functions. For example, the processor 1404 may include receiving circuitry 1440 configured to receive, from a RAN node (e.g., base station, such as a gNB or eNB) and via the transceiver 1410, a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. Additionally, or alternatively, the receiving circuitry 1440 may be configured to receive a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The receiving circuitry 1440 may further be configured to execute receiving instructions 1450 stored in the computer-readable storage medium 1406 to implement any of the one or more of the functions described herein.

The processor 1404 may also include updating circuitry 1442 configured to update the one or more TCI-states or the one or more SRs for the group of two or more component carriers for the multi-component carrier communication based on the message. Additionally, or alternatively, the updating circuitry 1442 may be configured to updating the one or more PL-RSs for the group of two or more component carriers for the multi-component carrier communication based on the message. The updating circuitry 1442 may further be configured to execute updating instructions 1452 stored in the computer-readable storage medium 1406 to implement any of the one or more of the functions described herein.

The processor 1404 may further include communication circuitry 1444 configured to utilize a communication link and communicate with a base station using access communication by aggregating at least two of the plurality of access component carriers for the multi-component carrier communication. Additionally, or alternatively, the communication circuitry 1444 may be configured to utilize a communication link and communicate with another UE using sidelink communication by aggregating at least two of the plurality of sidelink component carriers for the multi-component carrier communication. The communication circuitry 1444 may further be configured to execute communication instructions 1454 stored in the computer-readable storage medium 1406 to implement any of the one or more of the functions described herein.

Figure 15:
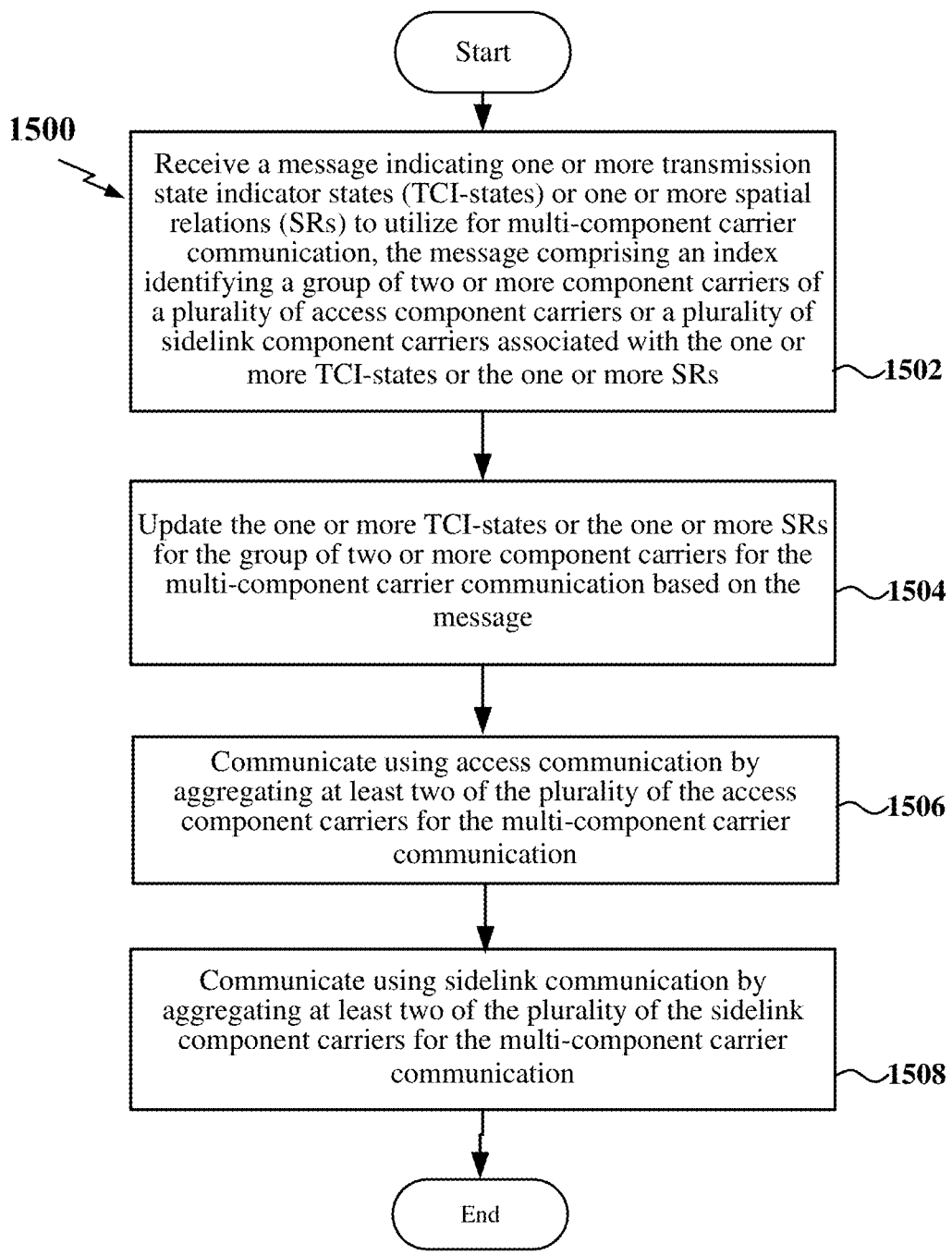
FIG. 15 is a flow chart of a method for receiving and updating transmission configuration indicator states (TCI-states) or spatial relations (SRs) to utilize for multi-component communication according to some aspects.

FIG. 15 is a flow chart 1500 of a method for receiving and updating transmission configuration indicator states (TCI-states) or spatial relations (SRs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1502, the UE 1400 receives a message indicating one or more transmission configuration indicator states (TCI-states) or one or more spatial relations (SRs) to utilize for multi-component carrier communication. The message may include an index identifying a group of two or more component carriers of a plurality of access component carriers or a plurality of sidelink component carriers associated with the one or more TCI-states or the one or more SRs. The message may include at least one of a medium access control (MAC) control element (MAC-CE), or downlink control information (DCI).

The TCI-states or SRs may indicate the spatial property (e.g., beam direction and/or beam width) of a transmit beams to be utilized by a wireless communication device. For example, for access communication, the TCI-state may include quasi co-location (QCL) information (e.g., QCL-Type D) referencing an access SSB beam or access CSI-RS transmit beam on the transmitting wireless communication device. Similarly, the SRI may indicate a spatial relation between an access SSB or access CSI-RS beam and an uplink transmit beam utilized by the UE for uplink transmissions. In this example, a wireless communication device may identify the selected uplink transmit beam having a spatial direction in the same direction as the indicated access SSB or CSI-RS beam. Similarly, for sidelink communication, the TCI states or SRs may indicate the sidelink transmit beams to be utilized for communication on the sidelink between UEs Subsequently, the receive beams may be determined by the BPL.

The message may include one of a TCI-state activation and deactivation message or an SRI activation and deactivation message. For example, the message may include a binary string of one or more "zeros" and one or more "ones" for activating or deactivating each of a plurality of TCI-states including the one or more TCI states or each of a plurality of SRs including the one or more SRs. The message may also include an index identifying a group of two or more component carriers of a plurality of access component carriers or a plurality of sidelink component carriers associated with the one or more TCI-states or the one or more SRs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first TCI-states or first SRs to utilize for access multi-component carrier communication. The first entry may include a first index identifying a first group of two or more component carriers of the plurality of access component carriers associated with the first TCI-states or the first SRs. Additionally, or alternatively, the message may include a second entry indicating second TCI-states or second SRs to utilize for sidelink multi-component carrier communication. The second entry may include a second index identifying a second group of two or more component carriers of the plurality of sidelink component carriers associated with the second TCI-states or the second SRs.

The reception of the message indicating one or more transmission configuration indicator states (TCI-states) or one or more spatial relations (SRs) to utilize for multi-component carrier communication may be further described with respect to the description of FIGS. 1-5, 7, 8, and 9 provided herein. The receiving circuitry 1440, together with the transceiver 1410, shown and described above in connection with FIG. 14, may provide a means to receive the message indicating one or more transmission configuration indicator states (TCI-states) or one or more spatial relations (SRs) to utilize for multi-component carrier communication.

At block 1504, the UE 1400 updates the one or more TCI-states or the one or more SRs for the group of two or more component carriers for the multi-component carrier communication based on the message. For example, in response to receiving the message from the RAN node, the UE may update the one or more TCI-states or the one or more SRs for the group of two or more component carriers for the multi-component carrier communication based on the message. In some aspects, when a reference signal source of a TCI-state of the one or more TCI-states or an SRI of the one or more SRs in the message is associated with access communication, the UE may update the one or more TCI-states or the one or more SRs for the group of two or more component carriers of the plurality of access carriers. In some aspects, when a reference signal source of a TCI-state of the one or more TCI-states or an SRI of the one or more SRs in the message is associated with sidelink communication, the UE may update the one or more TCI-states or the one or more SRs for the group of two or more component carriers for the plurality of sidelink carriers. The updating circuitry 1442 shown and described above in connection with FIG. 14 may provide a means to update the one or more TCI-states or the one or more SRs for the group of two or more component carriers for the multi-component carrier communication based on the message.

At block 1506, the UE 1400 communicates using access communication by aggregating at least two of the plurality of access component carriers for the multi-component carrier communication. For example, the UE may communicate with the RAN node using access communication by aggregating at least two of the plurality of access component carriers for the multi-component carrier communication. In some examples, the UE may communicate with the RAN node on one or more beams on each of the aggregated access component carriers, as indicated in the message. For example, the message may provide a means to indicate a transmit downlink beam or a transmit uplink beam to use on one or more of the aggregated access component carriers. The communication circuitry 1444, together with the transceiver 1410, shown and described above in connection with FIG. 14 may provide a means to communicate using access communication by aggregating at least two of the plurality of access component carriers for the multi-component carrier communication.

At block 1508, the UE 1400 communicates using sidelink communication by aggregating at least two of the plurality of access component carriers for the multi-component carrier communication. For example, the UE may communicate with another UE using sidelink communication by aggregating at least two of the plurality of the sidelink component carriers for the sidelink multi-component carrier communication. In some examples, the UE may communicate with the other UE on one or more beams on each of the aggregated sidelink component carriers, as indicated in the message. For example, the message may indicate a transmit sidelink beam to use by the UE or the other UE on one or more of the aggregated sidelink component carriers. The communication circuitry 1444, together with the transceiver 1410, shown and described above in connection with FIG. 14 may provide a means to communicate using sidelink communication by aggregating at least two of the plurality of access component carriers for the multi-component carrier communication.

Figure 16:
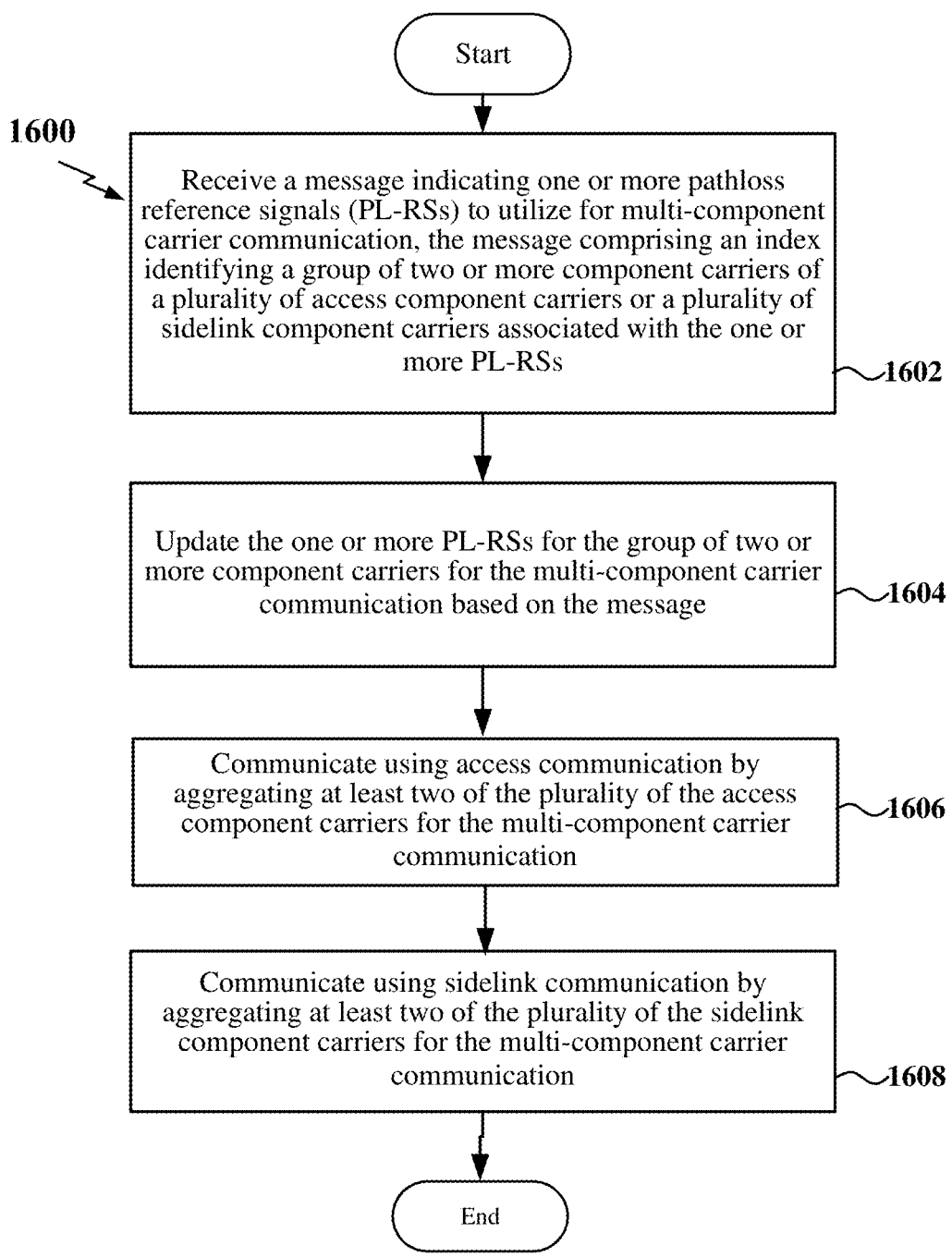
FIG. 16 is a flow chart of a method for receiving and updating pathloss reference signals (PL-RSs) to utilize for multi-component communication according to some aspects.

FIG. 16 is a flow chart of a method for receiving and updating pathloss reference signals (PL-RSs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1602, the UE 1400 receives a message indicating one or more pathloss reference signals (PL-RSs) to utilize for multi-component carrier communication. The message may include an index identifying a group of two or more component carriers of a plurality of access component carriers or a plurality of sidelink component carriers associated with the one or more PL-RSs. The message may include at least one of a medium access control (MAC) control element (MAC-CE), or downlink control information (DCI).

The message may include one of a PL-RS activation and deactivation message. For example, the message may include a binary string of one or more "zeros" and one or more "ones" for activating or deactivating each of a plurality of PL-RSs. The message may also include an index identifying a group of two or more component carriers of a plurality of access component carriers or a plurality of sidelink component carriers associated with the one or more PL-RSs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first PL-RSs to utilize for access multi-component carrier communication. The first entry may include a first index identifying a first group of two or more component carriers of the plurality of access component carriers associated with the first PL-RSs. Additionally, or alternatively, the message may include a second entry indicating second PL-RSs to utilize for sidelink multi-component carrier communication. The second entry may include a second index identifying a second group of two or more component carriers of the plurality of sidelink component carriers associated with the second PL-RSs.

The reception of the message indicating one or more PL-RSs to utilize for multi-component carrier communication may be further described with respect to the description of FIGS. 1-5, 7, 8, and 9 provided herein. The receiving circuitry 1440, together with the transceiver 1410, shown and described above in connection with FIG. 14, may provide a means to receive the message indicating one or more PL-RSs to utilize for multi-component carrier communication.

At block 1604, the UE 1400 updates the one or more PL-RSs for the group of two or more component carriers for the multi-component carrier communication based on the message. For example, in response to receiving the message from the RAN node, the UE may update the one or more PL-RSs for the group of two or more component carriers for the multi-component carrier communication based on the message. In some aspects, when a reference signal source of a PL-RS of the one or more PL-RSs in the message is associated with access communication, the UE updates the one or more PL-RSs for the group of two or more component carriers of the plurality of access carriers. In some aspects, when a reference signal source of a PL-RS of the one or more PL-RSs in the message is associated with sidelink communication, the UE updates the one or more PL-RSs for the group of two or more component carriers for the plurality of sidelink carriers. The updating circuitry 1442 shown and described above in connection with FIG. 14, may provide a means to update the one or more PL-RSs for the group of two or more component carriers for the multi-component carrier communication based on the message.

At block 1606, the UE 1400 communicates using access communication by aggregating at least two of the plurality of access component carriers for the multi-component carrier communication. For example, the UE may communicate with the RAN node using access communication by aggregating at least two of the plurality of access component carriers for the multi-component carrier communication. In some examples, the UE may communicate with the RAN node on one or more beams on each of the aggregated access component carriers, as indicated in the message. The communication circuitry 1444, together with the transceiver 1410, shown and described above in connection with FIG. 14 may provide a means to communicate using access communication by aggregating at least two of the plurality of component carriers.

At block 1608, the UE 1400 communicates using sidelink communication by aggregating at least two of the plurality of access component carriers for the multi-component carrier communication. For example, the UE may communicate with another UE using sidelink communication by aggregating at least two of the plurality of the sidelink component carriers for the sidelink multi-component carrier communication. In some examples, the UE may communicate with the other UE on one or more beams on each of the aggregated sidelink component carriers. For example, the message may indicate a PL-RS to use by the UE or the other UE on one or more of the aggregated sidelink component carriers. The communication circuitry 1444, together with the transceiver 1410, shown and described above in connection with FIG. 14 may provide a means to communicate using sidelink communication by aggregating at least two of the plurality of access component carriers for the multi-component carrier communication.

Figure 17:
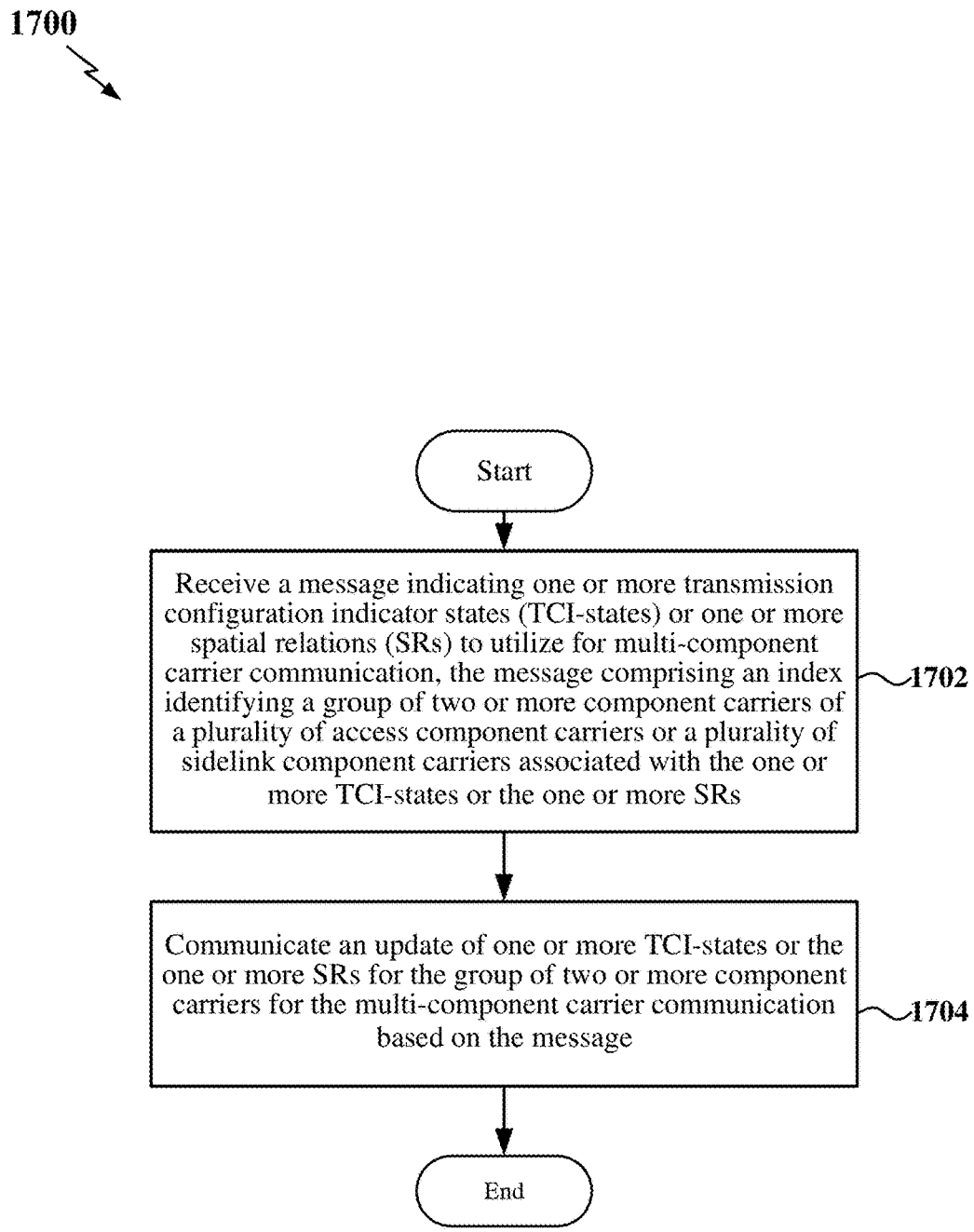
FIG. 17 is a flow chart of another method for receiving and updating transmission configuration indicator states (TCI-states) or spatial relations (SRs) to utilize for multi-component communication according to some aspects.

FIG. 17 is a flow chart 1700 of a method for receiving and updating transmission configuration indicator states (TCI-states) or spatial relations (SRs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the UE 1400, as described above, and illustrated in FIG. 14, by a processor or processing system, or by any suitable means for carrying out the described functions.

At block 1702, the UE 1400 receives a message indicating one or more transmission configuration indicator states (TCI-states) or one or more spatial relations (SRs) to utilize for multi-component carrier communication, the message comprising an index identifying a group of two or more component carriers of a plurality of access component carriers or a plurality of sidelink component carriers associated with the one or more TCI-states or the one or more SRs. The message may include an index identifying a group of two or more component carriers of a plurality of access component carriers or a plurality of sidelink component carriers associated with the one or more TCI-states or the one or more SRs. The message may include at least one of a medium access control (MAC) control element (MAC-CE), or downlink control information (DCI).

The TCI-states or SRs may indicate the spatial property (e.g., beam direction and/or beam width) of a transmit beams to be utilized by a wireless communication device. For example, for access communication, the TCI-state may include quasi co-location (QCL) information (e.g., QCL-Type D) referencing an access SSB beam or access CSI-RS transmit beam on the transmitting wireless communication device. Similarly, the SRI may indicate a spatial relation between an access SSB or access CSI-RS beam and an uplink transmit beam utilized by the UE for uplink transmissions. In this example, a wireless communication device may identify the selected uplink transmit beam having a spatial direction in the same direction as the indicated access SSB or CSI-RS beam. Similarly, for sidelink communication, the TCI states or SRs may indicate the sidelink transmit beams to be utilized for communication on the sidelink between UEs Subsequently, the receive beams may be determined by the BPL.

The message may include one of a TCI-state activation and deactivation message or an SRI activation and deactivation message. For example, the message may include a binary string of one or more "zeros" and one or more "ones" for activating or deactivating each of a plurality of TCI-states including the one or more TCI states or each of a plurality of SRs including the one or more SRs. The message may also include an index identifying a group of two or more component carriers of a plurality of access component carriers or a plurality of sidelink component carriers associated with the one or more TCI-states or the one or more SRs. In some aspects, the index may identify the group of two or more component carriers from a set of all configured component carriers of the plurality of access component carriers or the plurality of sidelink component carriers. In some aspects, the index may identify the group of two or more component carriers from a set of all active component carriers of the plurality of access component carriers or the plurality of sidelink component carriers. In some aspects, the index may include a group index identifying a designated component carrier representing the group of two or more component carriers.

The message may include a first entry indicating first TCI-states or first SRs to utilize for access multi-component carrier communication. The first entry may include a first index identifying a first group of two or more component carriers of the plurality of access component carriers associated with the first TCI-states or the first SRs. Additionally, or alternatively, the message may include a second entry indicating second TCI-states or second SRs to utilize for sidelink multi-component carrier communication. The second entry may include a second index identifying a second group of two or more component carriers of the plurality of sidelink component carriers associated with the second TCI-states or the second SRs.

The reception of the message indicating one or more transmission configuration indicator states (TCI-states) or one or more spatial relations (SRs) to utilize for multi-component carrier communication may be further described with respect to the description of FIGS. 1-5, 7, 8, and 9 provided herein. The receiving circuitry 1440, together with the transceiver 1410, shown and described above in connection with FIG. 14, may provide a means to receive a message indicating one or more transmission configuration indicator states (TCI-states) or one or more spatial relations (SRs) to utilize for multi-component carrier communication, the message comprising an index identifying a group of two or more component carriers of a plurality of access component carriers or a plurality of sidelink component carriers associated with the one or more TCI-states or the one or more SRs.

At block 1704, the UE 1400 communicates an update of one or more TCI-states or the one or more SRs for the group of two or more component carriers for the multi-component carrier communication based on the message. For example, in response to receiving the message from the RAN node, the UE may update the one or more TCI-states or the one or more SRs for the group of two or more component carriers for the multi-component carrier communication based on the message. In some aspects, when a reference signal source of a TCI-state of the one or more TCI-states or an SRI of the one or more SRs in the message is associated with access communication, the UE may update the one or more TCI-states or the one or more SRs for the group of two or more component carriers of the plurality of access carriers. In some aspects, when a reference signal source of a TCI-state of the one or more TCI-states or an SRI of the one or more SRs in the message is associated with sidelink communication, the UE may update the one or more TCI-states or the one or more SRs for the group of two or more component carriers for the plurality of sidelink carriers. The communication circuitry 1444, together with the transceiver 1410, shown and described above in connection with FIG. 14 may provide a means to communicate an update of one or more TCI-states or the one or more SRs for the group of two or more component carriers for the multi-component carrier communication based on the message.

The following provides an overview of aspects of the present disclosure:

Aspect 1: A method for wireless communication at a user equipment (UE), comprising: receiving a message indicating one or more transmission configuration indicator states (TCI-states) or one or more spatial relations (SRs) to utilize for multi-component carrier communication, the message comprising an index identifying a group of two or more component carriers of a plurality of access component carriers or a plurality of sidelink component carriers associated with the one or more TCI-states or the one or more SRs; and updating the one or more TCI-states or the one or more SRs for the group of two or more component carriers for the multi-component carrier communication based on the message.

Aspect 2: The method of aspect 1, wherein the index identifies the group of two or more component carriers from a set of all configured component carriers of the plurality of access component carriers or the plurality of sidelink component carriers.

Aspect 3: The method of aspect 1, wherein the index identifies the group of two or more component carriers from a set of all active component carriers of the plurality of access component carriers or the plurality of sidelink component carriers.

Aspect 4: The method of aspect 1, wherein the index comprises a group index identifying a designated component carrier representing the group of two or more component carriers.

Aspect 5: The method of aspect 1, wherein the message comprises at least one of a medium access control (MAC) control element (MAC-CE), sidelink control information (SCI), or downlink control information (DCI).

Aspect 6: The method of aspect 1, wherein the message comprises one of a TCI-state activation and deactivation message or an SRI activation and deactivation message.

Aspect 7: The method of aspect 6, wherein the message comprises a binary string for activating or deactivating each of a plurality of TCI-states including the one or more TCI states or each of a plurality of SRs including the one or more SRs.

Aspect 8: The method of aspect 1, further comprising: updating the one or more TCI-states or the one or more SRs for the group of two or more component carriers of the plurality of access carriers in response to a reference signal source of a TCI-state of the one or more TCI-states or an SR of the one or more SRs in the message being associated with access communication.

Aspect 9: The method of aspect 1, further comprising: updating the one or more TCI-states or the one or more SRs for the group of two or more component carriers for the plurality of sidelink carriers in response to a reference signal source of a TCI-state of the one or more TCI-states or an SR of the one or more SRs in the message being associated with the access communication.

Aspect 10: The method of aspect 1, further comprising at least one of: communicating with a base station using access communication by aggregating at least two of the plurality of access component carriers for the multi-component carrier communication, or communicating with another UE using sidelink communication by aggregating at least two of the plurality of the sidelink component carriers for the sidelink multi-component carrier communication.

Aspect 11: The method of aspect 1, wherein the message comprises at least one of: a first entry indicating first TCI-states or first SRs to utilize for access multi-component carrier communication, the first entry comprising a first index identifying a first group of two or more component carriers of the plurality of access component carriers associated with the first TCI-states or the first SRs, or a second entry indicating second TCI-states or second SRs to utilize for sidelink multi-component carrier communication, the second entry comprising a second index identifying a second group of two or more component carriers of the plurality of sidelink component carriers associated with the second TCI-states or the second SRs.

Aspect 12: A user equipment (UE) in a radio access network (RAN) of a wireless communication system, the UE comprising: a wireless transceiver; a memory; and a processor communicatively coupled to the wireless transceiver and the memory, wherein the processor and memory are configured to perform a method of any one of aspects 1 through 11.

Aspect 13: A user equipment (UE) comprising means for performing a method of any one of aspects 1 through 11.

Aspect 14: A non-transitory processor-readable storage medium storing processor-executable instructions for causing a processing circuit to perform a method of any one of aspects 1 through 11.

Aspect 15: A method for wireless communication at a Radio Access Network (RAN) node, comprising: generating a message indicating one or more transmission configuration indicator states (TCI-states) or one or more spatial relations (SRs) to utilize for multi-component carrier communication, the message comprising an index identifying a group of two or more component carriers of a plurality of access component carriers or a plurality of sidelink component carriers associated with the one or more TCI-states or the one or more SRs, and transmitting the message to a user equipment (UE) to update the one or more TCI-states or the one or more SRs for the group of two or more component carriers for the multi-component carrier communication based on the message.

Aspect 16: The method of aspect 15, wherein the index identifies the group of two or more component carriers from a set of all configured component carriers of the plurality of access component carriers or the plurality of sidelink component carriers.

Aspect 17: The method of aspect 15, wherein the index identifies the group of two or more component carriers from a set of all active component carriers of the plurality of access component carriers or the plurality of sidelink component carriers.

Aspect 18: The method of aspect 15, wherein the index comprises a group index identifying a designated component carrier representing the group of two or more component carriers.

Aspect 19: The method of aspect 15, wherein the message comprises at least one of a medium access control (MAC) control element (MAC-CE), sidelink control information (SCI), or downlink control information (DCI).

Aspect 20: The method of aspect 15, wherein the message comprises one of a TCI-state activation and deactivation message or an SR activation and deactivation message.

Aspect 21: The method of aspect 20, wherein the message comprises a binary string for activating or deactivating each of a plurality of TCI-states including the one or more TCI states or each of a plurality of SRs including the one or more SRs.

Aspect 22: The method of aspect 15, further comprising: updating the one or more TCI-states or the one or more SRs for the group of two or more component carriers of the plurality of access carriers in response to a reference signal source of a TCI-state of the one or more TCI-states or an SR of the one or more SRs in the message being associated with access communication.

Aspect 23: The method of aspect 15, further comprising: updating the one or more TCI-states or the one or more SRs for the group of two or more component carriers for the plurality of sidelink carriers in response to a reference signal source of a TCI-state of the one or more TCI-states or an SR of the one or more SRs in the message being associated with the access communication.

Aspect 24: The method of aspect 15, further comprising at least one of: communicating using access communication by aggregating at least two of the plurality of the access component carriers for the multi-component carrier communication, or communicating using sidelink communication by aggregating at least two of the plurality of the sidelink component carriers for the multi-component carrier communication.

Aspect 25: A radio access network (RAN) node of a wireless communication system, the RAN node comprising: a wireless transceiver; a memory; and a processor communicatively coupled to the wireless transceiver and the memory, wherein the processor and memory are configured to perform a method of any one of aspects 15 through 24.

Aspect 26: A radio access network (RAN) node comprising means for performing a method of any one of aspects 15 through 24.

Aspect 27: A non-transitory processor-readable storage medium storing processor-executable instructions for causing a processing circuit to perform a method of any one of aspects 15 through 24.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-17 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) in a radio access network (RAN) of a wireless communication system, the UE comprising:
    one or more memories; and
    one or more processors coupled to the one or more memories, wherein the one or more processors are configured to:
        receive a message indicating one or more transmission configuration indicator states (TCI-states) or one or more spatial relations (SRs) to utilize for multi-component carrier communication, the message comprising an index identifying a group of two or more component carriers of a plurality of access component carriers or a plurality of sidelink component carriers associated with the one or more TCI-states or the one or more SRs; and
        update the one or more TCI-states or the one or more SRs for the group of two or more component carriers for the multi-component carrier communication based on an association of at least one reference signal source of a TCI-state of the one or more TCI-states or an SR of the one or more SRs in the message, wherein the at least one reference signal source is associated with at least one of access communication or sidelink communication.

2. The UE of claim 1, wherein the index identifies the group of two or more component carriers from a set of all configured component carriers of the plurality of access component carriers or the plurality of sidelink component carriers.

3. The UE of claim 1, wherein the index identifies the group of two or more component carriers from a set of all active component carriers of the plurality of access component carriers or the plurality of sidelink component carriers.

4. The UE of claim 1, wherein the index comprises a group index identifying a designated component carrier representing the group of two or more component carriers.

5. The UE of claim 1, wherein the message comprises at least one of a medium access control (MAC) control element (MAC-CE), sidelink control information (SCI), or downlink control information (DCI).

6. The UE of claim 1, wherein the message comprises one of a TCI-state activation and deactivation message or an SR activation and deactivation message.

7. The UE of claim 1, wherein the one or more processors are further configured to:
    update the one or more TCI-states or the one or more SRs for the group of two or more component carriers of the plurality of access carriers in response to the at least one reference signal source of a TCI-state of the one or more TCI-states or an SR of the one or more SRs in the message being associated with the access communication.

8. The UE of claim 1, wherein the one or more processors are further configured to:
    update the one or more TCI-states or the one or more SRs for the group of two or more component carriers for the plurality of sidelink carriers in response to the at least one reference signal source of a TCI-state of the one or more TCI-states or an SR of the one or more SRs in the message being associated with the sidelink communication.

9. The UE of claim 1, further comprising at least one of:
    communicating with a radio access network (RAN) node using access communication by aggregating at least two of the plurality of access component carriers for the multi-component carrier communication, or
    communicating with another UE using sidelink communication by aggregating at least two of the plurality of the sidelink component carriers for the sidelink multi-component carrier communication.

10. The UE of claim 1, wherein the message comprises at least one of:
    a first entry indicating first TCI-states or first SRs to utilize for access multi-component carrier communication, the first entry comprising a first index identifying a first group of two or more component carriers of the plurality of access component carriers associated with the first TCI-states or the first SRs, or
    a second entry indicating second TCI-states or second SRs to utilize for sidelink multi-component carrier communication, the second entry comprising a second index identifying a second group of two or more component carriers of the plurality of sidelink component carriers associated with the second TCI-states or the second SRs.

11. A method for wireless communication at a user equipment (UE), comprising:
    receiving a message indicating one or more transmission configuration indicator states (TCI-states) or one or more spatial relations (SRs) to utilize for multi-component carrier communication, the message comprising an index identifying a group of two or more component carriers of a plurality of access component carriers or a plurality of sidelink component carriers associated with the one or more TCI-states or the one or more SRs; and
    updating the one or more TCI-states or the one or more SRs for the group of two or more component carriers for the multi-component carrier communication based on an association of at least one reference signal source of a TCI-state of the one or more TCI-states or an SR of the one or more SRs in the message, wherein the at least one reference signal source is associated with at least one of access communication or sidelink communication.

12. The method of claim 11, wherein the index identifies the group of two or more component carriers from a set of all configured component carriers of the plurality of access component carriers or the plurality of sidelink component carriers.

13. The method of claim 11, wherein the index identifies the group of two or more component carriers from a set of all active component carriers of the plurality of access component carriers or the plurality of sidelink component carriers.

14. The method of claim 11, wherein the index comprises a group index identifying a designated component carrier representing the group of two or more component carriers.

15. The method of claim 11, wherein the message comprises at least one of a medium access control (MAC) control element (MAC-CE), sidelink control information (SCI), or downlink control information (DCI).

16. The method of claim 11, wherein the message comprises one of a TCI-state activation and deactivation message or an SR activation and deactivation message.

17. The UE of claim 11, further comprising:
updating the one or more TCI-states or the one or more SRs for the group of two or more component carriers of the plurality of access carriers in response to the at least one reference signal source of a TCI-state of the one or more TCI-states or an SR of the one or more SRs in the message being associated with the access communication.

18. The UE of claim 11, further comprising:
updating the one or more TCI-states or the one or more SRs for the group of two or more component carriers for the plurality of sidelink carriers in response to the at least one reference signal source of a TCI-state of the one or more TCI-states or an SR of the one or more SRs in the message being associated with the sidelink communication.

19. A radio access network (RAN) node in a RAN of a wireless communication system, comprising:
one or more memories; and
one or more processors coupled to the one or more memories, wherein the one or more processors are configured to:
generate a message indicating one or more transmission configuration indicator states (TCI-states) or one or more spatial relations (SRs) to utilize for multi-component carrier communication, the message comprising an index identifying a group of two or more component carriers of a plurality of sidelink component carriers for communicating between a first user equipment (UE) and a second UE, the sidelink component carriers associated with the one or more TCI-states or the one or more SRs, and
transmit the message to the first UE to update the one or more TCI-states or the one or more SRs for the group of two or more component carriers for the multi-component carrier communication based on the message.

20. The RAN node of claim 19, wherein the index identifies the group of two or more component carriers from a set of all configured component carriers of the plurality of sidelink component carriers.

21. The RAN node of claim 19, wherein the index identifies the group of two or more component carriers from a set of all active component carriers of the plurality of sidelink component carriers.

22. The RAN node of claim 19, wherein the index comprises a group index identifying a designated component carrier representing the group of two or more component carriers.

23. The RAN node of claim 19, wherein the message comprises at least one of a medium access control (MAC) control element (MAC-CE), sidelink control information (SCI), or downlink control information (DCI).

24. The RAN node of claim 19, wherein the message comprises one of a TCI-state activation and deactivation message or an SR activation and deactivation message.

25. The RAN node of claim 24, wherein the message comprises a binary string for activating or deactivating each of a plurality of TCI-states including the one or more TCI states or each of a plurality of SRs including the one or more SRs.

26. The RAN node of claim 24, wherein the message further comprises:
an access entry indicating access TCI-states or access SRs to utilize for access multi-component carrier communication, the access entry comprising an access index identifying a group of two or more access component carriers of the plurality of access component carriers associated with the access TCI-states or the access SRs.

27. A method for wireless communication at a radio access network (RAN) node, comprising:
generating a message indicating one or more transmission configuration indicator states (TCI-states) or one or more spatial relations (SRs) to utilize for multi-component carrier communication, the message comprising an index identifying a group of two or more component carriers of or a plurality of sidelink component carriers for communicating between a first user equipment (UE) and a second UE, the sidelink component carriers associated with the one or more TCI-states or the one or more SRs; and
transmitting the message to the first UE to update the one or more TCI-states or the one or more SRs for the group of two or more component carriers for the multi-component carrier communication based on the message.

28. The method of claim 27, wherein the index identifies the group of two or more component carriers from a set of all configured component carriers of the plurality of sidelink component carriers.

29. The method of claim 27, wherein the index identifies the group of two or more component carriers from a set of all active component carriers of the plurality of sidelink component carriers.

30. The method of claim 27, wherein the index comprises a group index identifying a designated component carrier representing the group of two or more component carriers.

* * * * *

UNITED STATES PATENT AND TRADEMARK OFFICE
CERTIFICATE OF CORRECTION

| | | |
|---|---|---|
| PATENT NO. | : 11,943,769 B2 | Page 1 of 1 |
| APPLICATION NO. | : 17/391543 | |
| DATED | : March 26, 2024 | |
| INVENTOR(S) | : Sony Akkarakaran et al. | |

It is certified that error appears in the above-identified patent and that said Letters Patent is hereby corrected as shown below:

In the Claims

Column 47, Line 27 Claim 17: Replace the phrase "The UE of claim 11" with "The method of claim 11"

Column 47, Line 35 Claim 18: Replace the phrase "The UE of claim 11" with "The method of claim 11"

Signed and Sealed this
Eighteenth Day of November, 2025

John A. Squires
*Director of the United States Patent and Trademark Office*